United States Patent Office 3,586,683
Patented June 22, 1971

3,586,683
2,5(5) - DI(TRI)SUBSTITUTED - 10b-HYDROXY-
3,6 - DIOXO-OCTAHYDRO-OXAZOLO[3,2-a]
PYRROLO[2,1-c]PYRAZINE DERIVATIVES OF
LYSERGIC ACID
Paul Stadler, Biel-Benken Basel, and Albert Hofmann
and Franz Troxler, Bottmingen, Switzerland, assignors
to Sandoz Ltd., Basel, Switzerland
No Drawing. Filed Apr. 8, 1968, Ser. No. 719,674
Claims priority, application Switzerland, Apr. 12, 1967,
5,236/67; Nov. 23, 1967, 16,484/67
Int. Cl. C07d 43/20
U.S. Cl. 260—268
16 Claims

ABSTRACT OF THE DISCLOSURE

Compounds are of the class of 2,5,(5) - di(tri)sub-stituted - 10b - hydroxy - 3,6 - dioxo-octahydro-oxazolo [3,2-a]pyrrolo[2,1-c]pyrazine derivatives of lysergic acid and are useful as vasotonic agents. The compounds are prepared by reacting an appropriate aminocyclol with lysergic acid.

The present invention relates to new heterocyclic compounds and processes for their production.

The present invention provides compounds of general Formula I,

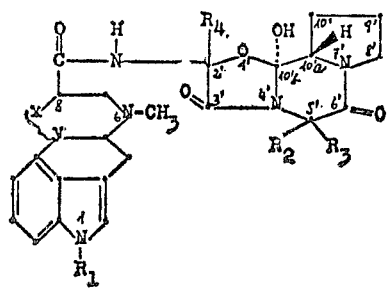

I in which $R_1$ signifies a hydrogen atom or methyl radical,
$R_2$ signifies an alkyl radical of 1 to 4 carbon atoms,
$R_3$ signifies an alkyl radical of 1 to 4 carbon atoms or a benzyl radical, or
$R_2$ and $R_3$ together with the carbon atom in the 5' position form a 4- to 7-membered, saturated, carbocyclic ring,
$R_4$ signifies an alkyl radical of 1 to 3 carbon atoms, and $\widetilde{x\ y}$ signifies $-CH_2-CH\diagdown$ or $-CH=C\diagdown$ and their acid addition salts with inorganic or organic acids.

The present invention further provides the following processes for the production of compounds of general Formula I:

(a) Compounds of general Formula I are obtained by reacting a salt of a compound of general Formula II,

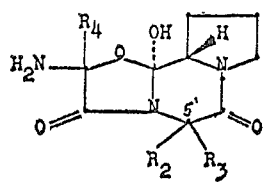

II in which $R_2$, $R_3$ and $R_4$ have the above significance, with a reactive, functional derivate of an acid of general Formula III,

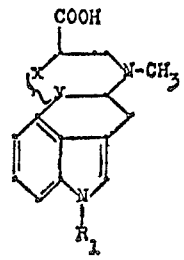

III in which $R_1$ and $\widetilde{x\ y}$ have the above significance, in a solvent or solvent mixture which is inert under the reaction conditions and in the presence of a basic condensation agent;

(b) Compounds of general Formula Ia,

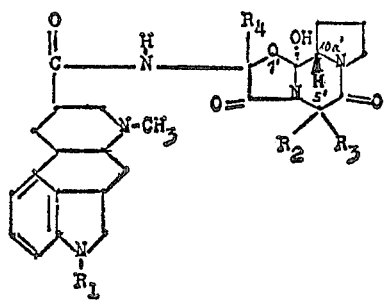

Ia in which $R_1$, $R_2$, $R_3$ and $R_4$ have the above significance, are obtained by hydrogenating a compound of general Formula Ib,

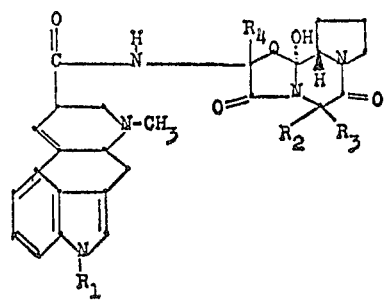

Ib in which $R_1$, $R_2$, $R_3$ and $R_4$ have the above significance;

(c) Compounds of general Formula Ic,

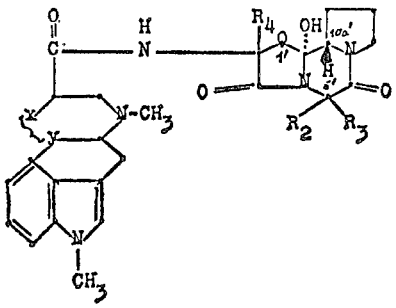

Ic in which

and $R_2$, $R_3$ and $R_4$ have the above significance, are obtained by methylating a compound of general Formulation Id,

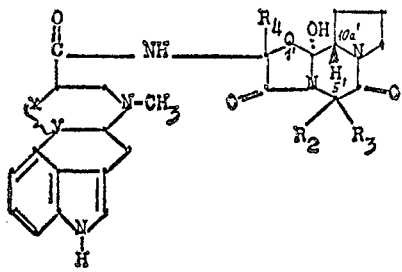

Id in which

and $R_2$, $R_3$ and $R_4$ have the above significance, in the presence of a strong base and in a solvent or solvent mixture which is inert under the reaction conditions. The compounds of general Formula I obtained in accordance with the above precesses are then optionally converted into their acid addition salts with inorganic or organic acids.

Suitable reactive, functional derivatives of acids of general Formula III, which may be used in the condensation of the invention in accordance with process (a), are their mixed anhydrides with sulphuric acid, their azides and, preferably, their acid chloride hydrochlorides. Examples of suitable solvents which are inert under the reaction conditions are dimethyl formamide, acetonitrile, methylene chloride and chloroform, and examples of suitable basic condensation agents are particularly teriary organic bases, e.g. pyridine or trimethylamine, and weak inorganic bases, e.g. alkali metal carbonates, pyridine being preferred. The function of the basic condensation agent is a rather complicated one and may include one or more of the following depending on the particular reactive functional acid derivative used:

(a) Liberation of aminocyclol of Formula II from its salt, (b) binding of acid liberated in the condensation, (c) complex formation and (d) a solvent function. The reaction is effected at a temperature between about $-20°$ and $+30°$ C., depending on the type of functional, reactive acid derivative used. Preferred temperatures for particular reactive functional acid derivatives are indicated below. In general the particular temperature adopted depends on a compromise between a low temperature favouring reduction of the tendency of the free aminocyclol of Formula II to rearrange and a higher temperature favouring the reactivity of the acid derivative. The compounds of general Formula II are used in the condensation of the invention in the form of their salts, as the compounds of general Formula II are unstable in the free form. Examples of acids which are sufficiently strong to form salts include hydrochloric, hydrobromic, sulphuric, oxalic, maleic, methanesulphonic and tartaric acid. The preferred salt is the hydrochloride.

One preferred method of effecting the process of the invention consists in that an acid chloride hydrochloride of an acid of general Formula III is reacted with a salt of a compound of general Formula II indicated above, e.g. in methylene chloride suspension, while cooling to about $-10°$ to $0°$ C., in the presence of a tertiary organic base, e.g. pyridine. The reaction mixture is then optionally allowed to stand at room temperature for some time in order to complete the reaction. After the reaction is completed the resulting compound of general Formula I is isolated from the reaction mixture in manner known per se, e.g. by diluting with the same or another solvent, washing the solution with basic wash solutions and subsequently with water, drying and concentrating the solution by evaporation and subjecting the residue to chromatography.

Another method of effecting the condensation of the invention is as follows: The mixed anhydride of an acid of general Formula III with sulphuric acid is condensed at $-10°$ to $0°$ C. in a solvent which is inert under the reaction conditions, e.g. dimethyl formamide, and in the presence of a tertiary organic base, e.g. pyridine, with a compound of general Formula II, which is used in the form of a salt indicated above, and the resulting compound of general Formula I is isolated from the reaction mixture and purified in manner known per se.

In accordance with another embodiment of the process of the invention the condensation is effected by reacting a solution of an azide of an acid of general Formula III, e.g. in the presence of a tertiary organic base, at a temperature of about $0°$ C. to room temperature ($20°$ C.), in a solvent which is inert under the reaction conditions, with a compound of general Formula II in the form of a salt.

For the best yields, the basic condensation agent should be added slowly to the reaction mixture.

Hydrogenation of compounds of general Formula Ib may be effected catalytically or with an alkali metal in liquid ammonia.

Catalytic hydrogenation is effected in a solvent which is inert under the reaction conditions, e.g. ethanol, or a solvent mixture, e.g. ethanol/methylene chloride, preferably at room temperature and normal pressure, but this hydrogenation may also be effected at an elevated temperature or pressure. Of the usual hydrogenation catalysts the palladium catalysts are especially suitable, particularly palladium on a carrier such as aluminium oxide. After the taking up of hydrogen is completed the reaction mixture is worked up, for example by filtering off the catalyst and isolating the final product from the filtrate and purifying in manner known per se.

The methylation of the invention in accordance with process (c) is effected using as strong bases preferably alkali metal alcoholates and alkali metal amides, and as solvent which is inert under the reaction conditions liquid ammonia, or a lower amine.

One preferred method of effecting this methylation process consists in adding portionwise metallic sodium or potassium to a solution of a lower aliphatic alcohol, e.g. ethanol, in liquid ammonia, and wating for the decolouration of the solution to occur. The compound to be methylated is added to the resulting suspension of the metal alcoholate at about $-40°$ C. while stirring well, and after the solution has occurred methyl iodide is added. The ammonia is subsequently evaporated off in a vacuum and the residue divided between an aqueous alkali metal carbonate solution and methylene chloride, the organic phase is washed with water, dried over sodium sulphate and the methylene chloride is removed.

About 5 mols of an alkali metal alcoholate or 1.5 to 2.0 mols of an alkali metal amide and about the same excess of methyl iodide are preferably used in this reaction for every mol of the compound to be methylated.

The new alkaloids of general Formula I produced in accordance with the invention are crystalline compounds at room temperature and with inorganic or strong organic acids form stable salts which are crystalline at room temperature. Examples of acids for salt formation are mineral acids such as hydrochloric, hydrobromic or sulphuric acid, strong organic acids such as tartaric acid, oxalic acid or methanesulphonic acid.

The compounds of general Formula Ib are named with trivial names in a manner analogous to that of other already known ergot peptide alkaloids, or with designated names derived from the basic skeleton of formula A which is to be called ergopeptine.

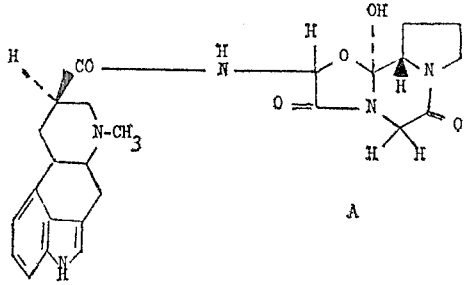

A

The alkaloids of general Formula Ia are named with the prefix 9,10-dihydro, followed by the trivial name. In the compounds of general Formula Ic the prefix "1-methyl" is placed before the name.

It should be noted that the compounds of the present application represent a completely new type of compound. They are not able to occur in nature because the aminoacids necessary for the biosynthesis of the relevant portion of compounds of Formula II (shown below in Formula II′) do not occur in nature. The said aminoacids are of the α, α-di substituted type which are purely synthetic products.

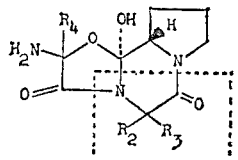

II

The compounds of Formula I and their acid addition salts possess pharmacological activity in animals. They are particularly useful as vasotonic agents as indicated by the vasopressor action in the spinal cat preparation [method of Barger G. and H. H. Dale, J, Physiol. (L) 41, 19 (1910)]. In this test dosages as low as $0.8/\mu g./kg.$ have been found to be effective, thus indicating that the compounds are very active.

For the above-mentioned use, the dosage administered will, of course, vary depending upon the compound employed, mode of administration and treatment desired. For large mammals, satisfactory results are, for example, obtained by administering a total daily dose of from about 1 to 50 $\mu g./kg.$ orally.

The compounds I and their acid addition salts are to be used in similar manner and for the same purposes as ergotamine and 9,10-dihydroergotamine (e.g. in the treatment of migraine and other vascular headaches, etc.) except that they are more specific (in particular their adrenanil-like activity is considerably lowered).

As in the case of ergotamine, the compounds have been found to be safe.

$LD_{50}$ values have been calculated in a variety of test animals and while the actual value naturally depends upon the specific compound tested, $LD_{50}$ values in excess of 1000 mg./kg. (orally; mice) have been obtained.

The compounds of general Formula I and their salts with therapeutically tolerated acids may be used as pharmaceuticals on their own or in the form of appropriate medicinal preparations for administration, e.g. orally, enterally or parenterally. In order to produce suitable medicinal preparations the compounds are worked up with pharmacologically inert adjuvants. Examples of such adjuvants are:

for tablets and dragées: lactose, starch, talcum and stearic acid;
for injectable preparations: water, alcohols, glycerin and vegetable oils;
for suppositories: natural or hardened oils and waxes.

The preparations may furthermore contain suitable preserving, stabilizing and wetting agents, solubilizers, sweetening and colouring substances, and flavourings.

The compounds of general Formula II used as starting materials are new, are only stable in the form of their salts, and their production also forms part of the present invention.

The compounds of general Formula II are produced in accordance with the invention by splitting off the benzyloxycarbonyl radical from a compound of general Formula IV,

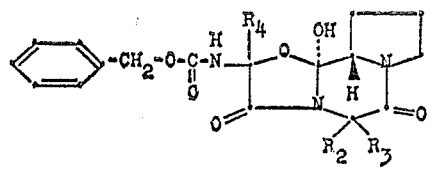

IV in which $R_2$, $R_3$ and $R_4$ have the above significance, in acid solution. The benzyloxycarbonyl protective radical of the urethanes of general Formula IV is preferably split off hydrogenolytically in an inert solvent, e.g. tetrahydrofuran, in which a mineral acid has been dissolved, whereby the salts of the compounds of general Formula II are obtained.

The compounds of general Formula IV used as starting materials are also new and may be obtained by converting a ketone of general Formula V,

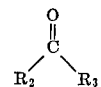

V in which, as well as in the following general Formulae VI to XVI, $R_2$ and $R_3$ have the above significance, into an aminonitrile of general Formula VI,

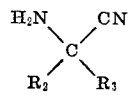

VI by treating with an alkali metal cyanide and an ammonium salt, hydrolizing the compound of general Formula VI as such, without isolation, to the amino acid of general Formula VII,

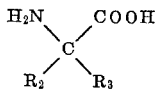

VII (in case racemates of optically active compounds of general Formula VII are obtained, these may be separated into their optical isomers with strong, optically active acids, and these optical isomers may be used in the further steps of synthesis), the compound of general Formula VII is esterified to a compound of general Formula VIII,

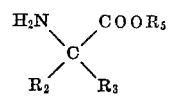

VIII in which $R_5$ signifies a lower alkyl radical, the ester of general Formula VIII is condensed in the presence of a reagent which is suitable for the production of peptide linkages with (2S)-N-benzyloxycarbonylproline to give a compound of general Formula IX,

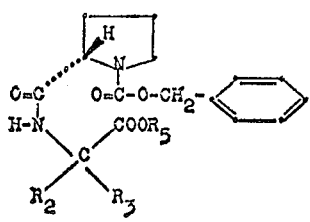

IX in which $R_5$ has the above significance, the benzyloxycarbonyl radical is split off hydrogenolytically from the compound of general Formula IX, whereupon the resulting compound of general Formula X,

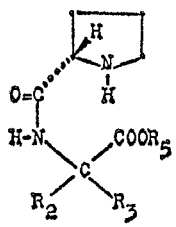

X in which $R_5$ has the above significance, is cyclized to a compound of general Formula XI,

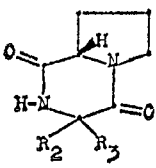

XI either spontaneously or by heating, the compound of general Formula XI is acylated in the presence of a tertiary amine and in a solvent which is inert under the reaction conditions with a 2-benzyloxymalonic acid monoethyl ester of general Formula XVII,

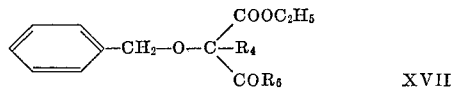

XVII in which, as well as in the general Formulae XII to XVI, $R_4$ signifies an alkyl radical of 1 to 3 carbon atoms, and $R_6$ signifies chlorine or bromine, the O-benzyl radical is split off hydrogenolytically from the resulting compound of general Formula XII,

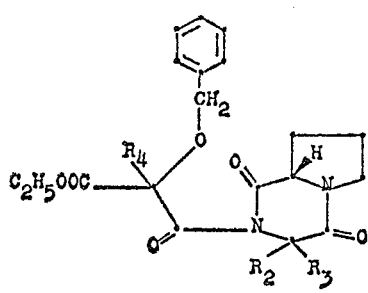

XII whereby spontaneous cyclization occurs to give a compound of general Formula XIII,

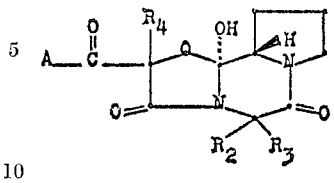

XIII: A = $-OC_2H_5$
XIV : A = $-OH$
XV : A = $Cl$
XVI : A = $-N_3$ this is saponified to a compound of general Formula XIV, this is converted into an acid chloride of general Formula XV, the compound of general Formula XV is reacted with sodium azide to give a compound of general Formula XVI, and this is converted into a benzyl urethane of general Formula IV by reacting with benzyl alcohol at an elevated temperature in a solvent which is inert under the reaction conditions.

The amino acids of general Formula VII are produced by reacting a ketone of general Formula V in accordance with Strecker's synthesis with an alkali metal cyanide and an ammonium salt, optionally in a solvent or solvent mixture which is inert under the reaction conditions, and saponifying the resulting aminonitrile of general Formula VI, preferably with a mineral acid. When the amino acids of general Formula VII have an asymmetric structure, they are advantageously separated into their optical antipodes via a salt with a strong, optically active acid, and their absolute configuration is deduced in manner known per se. Thus, for example, the racemic α-methylphenylalanine, obtained in accordance with Strecker's synthesis from benzylmethylketone, may be converted with (+)-camphor-10-sulphonic acid into a mixture of the two diastereoisomeric salts, which may be separated by crystallization. The splitting of the more difficultly soluble salt, e.g. with an ion exchange resin, yields the isomer with positive rotation in water, the absolute configuration of which may be deduced from the comparison of its rotation values with those of S-phenylalanine and from the rotation values of the diketopiperazine synthesized therefrom with S-proline.

The compounds of general Formula VII are converted into the amino acid esters of general Formula VIII in a lower alcohol with a mineral acid, e.g. hydrochloric acid. Their acylation with (2S)-N-benzyloxycarbonylproline to give dipeptides of general Formula IX is effected using a reagent suitable for the production of peptide linkages, e.g. mixed acid anhydrides or ethoxyacetylene, preferably, however, using dicyclohexylcarbodiimide in a solvent or solvent mixture which is inert under the reaction conditions.

Since the compounds of general Formula IX often only crystallize with great difficulty, they are catalytically hydrogenated in crude state, whereby the carbobenzoxy protective radical is removed. The resulting dipeptide esters of general Formula X, which are free at the amino end, often react spontaneously to give pyrrolo[1,2-a]pyrazines of general Formula XI. If this spontaneous reaction does not occur, they may be readily cyclized by heating, optionally with an acid or basic catalyst.

The pyrrolo[1,2-a]pyrazines of general Formula XI are subsequently acylated with a 2-benzyloxymalonic acid monoethyl ester of general Formula XVII in the presence of a tertiary amine, e.g. pyridine or N-ethyldiisopropylamine, and in a solvent which is inert under the reaction conditions, e.g. dioxane, preferably at a temperature of $-10°$ to $+90°$ C., to give compounds of general Formula XII. The O-benzyl radical is then removed hydrogenolytically from the compound of general Formula XII in a solvent or solvent mixture which is inert under the reaction conditions, e.g. ethyl acetate, methanol, ethanol or glacial acetic acid/water, preferably using a prehydrogenated palladium catalyst, whereupon spontaneous cyclization occurs to give a compound of general Formula XIII.

The ester radical of the thus obtained compound of general Formula XIII is subsequently converted into the amino radical, preferably as follows: the compound of general Formula XIII is saponified to a free acid of general Formula XIV by the action of a dilute, aqueous/alcoholic lye or dilute lye in a solvent which is inert under the reaction conditions, e.g. dioxane, at room temperature, the free acid of general Formula XIV is subsequently converted into the corresponding acid chloride of general Formula XV with phosphorus pentachloride in a solvent which is inert under the reaction conditions, e.g. ether. The production of the acid chloride of general Formula XV may likewise be effected via an alkali metal salt of the carboxylic acid of general Formula XIV with oxalyl chloride. Reaction of the acid chloride of general Formula XV, dissolved in an inert solvent, e.g. methylene chloride, with a concentrated, aqueous solution of sodium azide at room temperature then leads to the fairly unstable acid azide of general Formula XVI. The urethane of general Formula IV is obtained via the isocyanate resulting as intermediate by heating the acid azide with a small excess of benzyl alcohol in an inert solvent, e.g. chloroform, to the boil for a short period, with nitrogen evolution.

Insofar as the production of the starting materials required is not described, these are known or may be produced in manner known per se or in a manner analogous to that described in the examples. (Of course, the starting materials of Formula Ib and Id used in methods (b) and (c) may be obtained by method (a) using appropriate starting materials.)

The term "in manner known per se" as used herein designates methods in use or described in the literature on the subject.

In the following non-limitative examples all temperatures are indicated in degrees centigrade and are uncorrected.

The Formulae XVIII and XIX referred to in the examples are as follows:

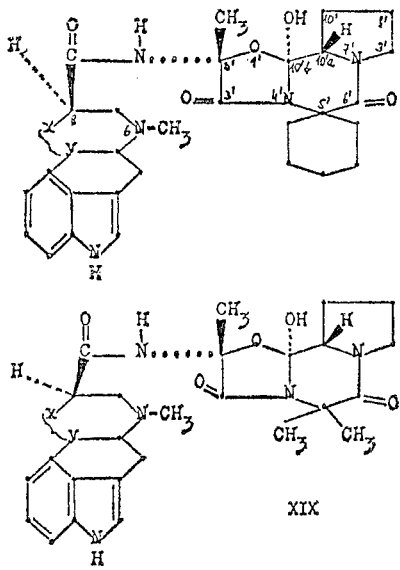

EXAMPLE 1.—ERGOSPIRONINE

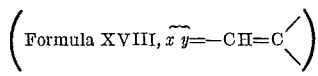

(a) 1-amino-1-cyano-cyclohexane.—280 g. of cyclohexanone in 900 cc. of methanol are added to a solution of 153 g. of ammonium chloride in 1.5 liters of water and 186 g. of potassium cyanide are added portionwise to this mixture while stirring, whereby a clear, light yellow coloured solution results in the course of half an hour; this solution is allowed to stand at room temperature for 5 days. The methanol is subsequently removed in a rotary evaporator, the remaining solution is made alkaline with solid potassium carbonate and is extracted thrice with ether. The combined ether solutions are washed with a dilute common salt solution, are dried with sodium sulphate and the solvent is evaporated. After distillation at 0.3 mm. of Hg the residue yields 1-amino-1-cyano-cyclohexane, a colourless oil, having a B.P. of 75–78°/0.3 mm. of Hg, $n_D^{20}=1.4745$.

(b) 1-aminocyclohexane-1-carboxylic acid.—121 g. of 1-amino-1-cyano-cyclohexane are added dropwise while stirring and cooling during the course of 15 minutes to 1.5 liters of concentrated hydrochloric acid, and the mixture is stirred at room temperature over night, 1.5 liters of water are added and heating to the boil at reflux is effected for 2 hours. After cooling the reaction mixture is filtered through active charcoal and the filtrate is dried. The residue is dissolved in 1.5 liters of concentrated ammonia solution while heating and is subsequently concentrated to about one third of its initial volume, whereby the crude amino acid crystallizes. After recrystallization from water pure 1-aminocyclohexane-1-carboxylic acid, having a M.P. of 320° (decomp.) is obtained in the form of colourless rectangular leaflets.

(c) 1-aminocyclohexane-1-carboxylic acid methyl ester.—92.9 g. of 1-aminocyclohexane-1-carboxylic acid are suspended in 2 liters of absolute methanol and gaseous hydrochloric acid is passed through this suspension at 10–15° until a 15% solution results. This clear solution is allowed to stand at room temperature over night, the excess hydrochloric acid and the methanol are then removed in a rotary evaporator and the resulting crystalline ester hydrochloride is dissolved in a minumum amount of ice water. After the addition of solid potassium carbonate until a clearly alkaline reaction (pH about 9) is obtained, extraction is effected thrice with methylene chloride. The combined methylene chloride solutions are washed once with a 20% common salt solution, are dried and the solvent is removed in a vacuum. After distillation in a water jet vacuum the residue yields 1-aminocyclohexane-1-carboxylic acid methyl ester as a colourless oil having a characteristic odour, B.P. 90–91°/12 mm. Hg, $n_D^{20}=1.4638$.

(d) (2S) - 1 - (benzyloxycarbonyl)-N-(1-methoxycarbonyl)cyclohexyl - 2 - pyrrolidinecarboxylic acid amide.—83.2 g. of (2S)-N-benzyloxycarbonylproline and 52.5 g. of 1-aminocyclohexane-1-carboxylic acid methyl ester are dissolved in 150 cc. of absolute methylene chloride and 50 cc. of absolute ether, the solution is cooled to 0° and 82.5 g. of dicyclohexylcarbodiimide in 250 cc. of absolute ether are added dropwise while stirring at 0–5° during the course of 15 minutes. The mixture is allowed to stand at room temperature over night, the precipitated dicyclohexyl urea is filtered off, the filtrate is diluted with methylene chloride and successively extracted with dilute phosphoric acid, water, potassium hydrogen carbonate solution and again with water. After drying with sodium sulphate and removing the solvent a crystalline crude product results, from which (2S)-1-(benzyloxycarbonyl)-N-(1-methoxycarbonyl) cyclohexyl-2-pyrrolidinecarboxylic acid amide, having a M.P. of 116–117°, is obtained after crystallization from methylene chloride/isopropyl ether. A sample of this compound is recrystallized twice more from methylene chloride/isopropyl ether, whereby the M.P. rises to 117–118°. Colourless needles, $[\alpha]_D^{20}=-43°$ (c.=1, ethanol).

(e) (8'aS) - 1',4' - dioxooctahydrospiro [ cyclohexane-1,3'-pyrrolo[1,2-a]pyrazine].—36.4 g. of (2S)-1-(benzyloxycarbonyl)cyclohexyl - N - (1-methoxycarbonyl)-2-pyrrolidinecarboxylic acid amide are hydrogenated in 450 cc. of glacial acetic acid with 10 g. of palladium/active charcoal catalyst (5% Pd) at room temperature and normal pressure. After the taking up of hydrogen has been completed (about 6 hours), the catalyst is filtered off and the filtrate carefully concentrated by evaporation in a vacuum. The resulting oil is shaken out between a sodium hydrogen carbonate solution and methylene chloride, the methylene chloride solution is dried and concentrated by evaporation, whereby crude (2S)-N-(1-methoxycarbonyl)cyclohexyl-2-pyrrolidinecarboxylic acid amide is obtained. The theoretical amount of glacial acetic acid (5.3 g., 88.2 millimols) in 440 cc. of absolute dioxane is added to this and the mixture is heated to the boil at reflux, whereby cyclization to the corresponding lactam occurs. After evaporating the glacial acetic acid and the dioxane the crystalline residue is recrystallized from methylene chloride/isopropyl ether. M.P. 165–166°, $[\alpha]_D^{20} = -122°$ (c.=1, ethanol).

(f) (2′R,10′aS,10′bS) - 2′ - ethoxycarbonyl-3′,6′-dioxo-10′b - hydroxy - 2′ - methyloctahydrospiro [ cyclohexane-1,5′(8′H) - oxazolo[3,2-a]pyrrolo[2,1-c]pyrazine].—30.8 g. of (8′aS)-1′,4′-dioxooctahydrospiro[cyclohexane-1,3′-pyrrolo[1,2-a]pyrazine] and 11 g. of absolute pyridine are suspended in 20 cc. of absolute dioxane, cooling is effected to 5°, 37.5 g. of S(+)-2-methyl-2-benzyloxymalonic acid chloride monoethyl ester are added dropwise at their temperature during the course of 10 minutes and the reaction mixture is stirred at 35° for 6 hours. Working up is effected by pouring the reaction mixture on ice-cold 2 N hydrochloric acid and extracting thrice with ether. The combined ether solutions are successively shaken out with water, sodium hydrogen carbonate solution and again with water, are dried with sodium sulphate and the ether is distilled off. A viscous light yellow oil is obtained, which is further worked up without purification. For this purpose 130 g. of (8′aS,αS)-2′-(α-ethoxycarbonyl-α-benzyloxypropionyl) - 1′,4′ - dioxooctahydrospiro[cyclohexane-1,3′-pyrrolo[1,2-a]pyrazine] in 1.5 liters of absolute ethyl acetate are hydrogenated with 35 g. of palladium/active charcoal catalyst at room temperature and 100 atmospheres. After 15 hours hydrogenation has been completed, filtration is effected and the solvent removed. The crude product is dissolved in ether and shaken out twice with water in order to remove the (8′aS)-1′,4′-dioxooctahydrospiro[cyclohexane - 1,3′ - pyrrolo - [1,2-a]pyrazine] which is readily soluble in water and is formed during hydrogenation as by-product. The aqueous phases are shaken out thrice with methylene chloride, the combined methylene chloride extracts are concentrated by evaporation, and after crystallization of the residue from methylene chloride/isopropyl ether (8′aS)-1′,4′-dioxooctahydrospiro[cyclohexane - 1,3′-pyrrolo[1,2-a]pyrazine], having a M.P. of 165–166°, is obtained. The ether solution of the hydrogenation product is dried with sodium sulphate and the solvent is evaporated. After repeated crystallization from methylene chloride/isopropyl ether and chromatography of the mother liquors on silica gel, the resulting crude product yields pure (2′R,10′aS,10′bS)-2′-ethoxycarbonyl - 3′,6′-dioxo-10′b-hydroxy-2′-methyloctahydrospiro-[cyclohexane - 1,5′(8′H) - oxazolo[3,2 - a]pyrrolo[2,1-c] pyrazine] having a M.P. of 111–112°. Colourless prisms, $[\alpha]_D^{20} = +26.5°$ (c.=1, ethanol), pK$^+_{MCS}$=10.85.

(g) (2′R,10′aS,10′bS) - 2′ - carboxy - 3′,6′-dioxo-10′b-hydroxy - 2′ - methyloctahydrospiro[cyclohexane - 1,5′ (8′H) - oxazolo[3,2-a]pyrrolo[2,1-c]pyrazine].—18 g. of (2′R,10′aS,10′bS) - 2′ - ethoxycarbonyl - 3′,6′-dioxo-10′b-hydroxy - 2′ - methyloctahydrospiro [cyclohexane - 1,5′ (8′H) - oxazolo[3,2 - a]pyrrolo[2,1 - c]pyrazine] are dissolved in 98 cc. of a 1 N sodium hydroxide solution at 10° and the solution is allowed to stand at this temperature for half an hour. The pH value is then adjusted to 7 with 1 N hydrochloric acid and extraction is effected twice with ethyl acetate, whereby a neutral portion results. The aqueous phase is acidified to a pH of about 2 with cold 2 N hydrochloric acid, is extracted 4 times with methylene chloride, the combined methylene chloride solutions are again washed twice with a 15% common salt solution, are dried and the solution is concentrated to about 50 cc. at a bath temperature of 20° in a rotary evaporator. This solution is diluted with isopropyl ether, whereby the (2′R,10′aS,10′bS) - 2′ - carboxy-3′,6′-dioxo-10′b-hydroxy - 2′ - methyloctahydrospiro[cyclohexane-1,5′ (8′H) - oxazolo[3,2 - a]pyrrolo[2,1-c]pyrazine], having a great liability to decomposition, crystallizes in the form of rodlet-like crystals having a M.P. of 134–135° (decomp.), $[\alpha]_D^{20} = +32°$ (c.=1, ethanol), pK$^+_{MCS}$=3.56.

(h) (2′R,10′aS,10′bS) - 2′ - chloroformyl - 3′,6′-dioxo-10′b - hydroxy - 2′-methyloctahydrospiro[cyclohexane-1,5′ (8′H) - oxazolo[3,2-a]pyrrolo[2,1-c]pyrazine].—7.3 g. of freshly sublimated phosphorus pentachloride are stirred in a mixture of 50 cc. of absolute ether and 100 cc. of absolute petroleum ether for 2 hours, whereby the phosphorus pentachloride dissolves almost completely. 5.9 g. of finely pulverized, high vacuum dried (2′R,10′aS,10′bS)-2′-carboxy - 3′,6′ - dioxo-10′b-hydroxy-2′-methyloctahydrospiro [cyclohexane - 1,5′(8′H) - oxazolo[3,2-a]pyrrolo[2,1-c] pyrazine] are then added and the mixture is stirred at 20° for 1½ hours. After filtering off the precipitated (2′R,10′aS,10′bS) - 2′ - chloroformyl-3′,6′-dioxo-10′b-hydroxy - 2′ - methyloctahydrospiro[cyclohexane-1,5′(8′H)-oxazolo[3,2-a]pyrrolo[2,1-c]pyrazine], subsequent washing with petroleum ether and careful drying in a high vacuum, (2′R,10′aS,10′bS) - 2′ - chloroformyl-3′,6′-dioxo-10′b-hydroxy - 2′ - methyloctahydrospiro[cyclohexane-1,5′ (8′H)-oxazolo[3,2-a]pyrrolo[2,1-c]pyrazine] is obtained in the form of quadrangular plates having a M.P. of 114–116° (decomp.), $[\alpha]_D^{20} = +45°$ (c.=1, methylene chloride).

(i) (2′R,10′aS,10′bS)-2′-azidocarbonyl - 3′,6′ - dioxo-10′b-hydroxy-2′-methyloctahydrospiro[cyclohexane - 1,5′ (8′H)-oxazolo[3,2-a]pyrrolo[2,1-c]pyrazine].—5.3 g. of (2′R,10′aS,10′bS)-2′-chloroformyl - 3′,6′ - dioxo - 10′b-hydroxy - 2′ - methyloctahydrospiro[cyclohexane - 1,5′ (8′H) - oxazolo[3,2 - a]pyrrolo[2,1 - c]pyrazine] are dissolved in 75 cc. of absolute acetone, the solution is cooled to 10° and 5.3 g. of sodium azide in 12 cc. of water are added in one batch while stirring. After stirring for 5 minutes the acetone is filtered off with suction in the cold in a vacuum, the residue is diluted with sodium hydrogen carbonate solution and extracted thrice with methylene chloride. The combined methylene chloride solutions are washed once with water, dried with sodium sulphate and the solvent is removed in a vacuum at a bath temperature of 20°. The oily residue yields (2′R, 10′aS,10-bS)-2′-azidocarbonyl-3′,6′dioxo - 10′b - hydroxy-2′-methyloctahydrospiro[cyclohexane - 1,5′(8′H) - oxazolo[3,2-a]pyrrolo[2,1-c]pyrazine], having a M.P. of 90° (decomp.), after crystallization from ether/petroleum ether.

(j) (2′R,10′aS,10′bS)-2′-benzyloxycarbonylamino - 3′, 6′-dioxo-10′b-hydroxy - 2′ - methyloctahydrospiro[cyclohexane-1,5′(8′H) - oxazolo[3,2 - a]pyrrolo[2,1 - c]pyrazine].—3.6 g. of (2′R,10′aS,10′bS)-2′-azidocarbonyl-3′,6′-dioxo-10′b - hydroxy - 2′ - methyloctahydrospiro[cyclohexane-1,5′(8′H)-oxazolo[3,2 - a]pyrrolo[2,1 - c]pyrazine] are dissolved in 25 cc. of absolute chloroform, 5 cc. of absolute benzyl alcohol are added and the mixture is heated to the boil at reflux for 45 minutes. The solvent is then removed and the excess benzyl alcohol is distilled off in a high vacuum. The crystalline crude product yields pure (2′R,10′aS,10′bS) - 2′ - benzyloxycarbonylamino-3′,6′-dioxo-10′b-hydroxy-2′ - methyloctahydrospiro[cyclohexane-1,5′(8′H) - oxazolo[3,2 - a]pyrrolo[2,1 - c]pyrazine], having a M.P. of 225–226° (decomp.), $$[\alpha]_D^{20} = +20°$$

(c.=1, ethanol), after crystallization from ethyl acetate.

(k) (2′R,10′aS,10′bS)-2′-amino - 3′,6′ - dioxo - 10′b-hydroxy - 2′ - methyloctahydrospiro[cyclohexane - 1,5′ (8′H) - oxozolo[3,2 - a]pyrrolo[2,1 - c]pyrazine]hydrochloride.—5 g. of (2′R,10′aS,10′bS) - 2′ - benzyloxycarbonylamino-3′,6′-dioxo-10′b - hydroxy - 2′ - methyloctahydrospiro[cyclohexane-1,5′(8′H) - oxazolo[3,2 - a]pyrrolo[2,1-c]pyrazine] in 100 cc. of absolute tetrahydrofuran in which 450 mg. of gaseous hydrochloric acid have been dissolved, are hydrogenated with 3 g. of prehydrogenated palladium/active charcoal catalyst (5% Pd) at room temperature until the taking up of hydrogen is completed (about 20 minutes, amount of hydrogen taken up 145 cc.). After filtering off the catalyst and the partially crystallizing (2′R,10′aS,10′bS) - 2′ - amino - 3′,6 - dioxo-10′b-hydroxy-2′ - methyloctahydrospiro[cyclohexane - 1, 5′(8′H)-oxazolo[3,2 - a]pyrrolo[2,1 - c]pyrazine] hydrochloride, the tetrahydrofuran solution is concentrated almost to dryness in a vacuum at 20°, the residue is combined with the methanol eluate of the catalyst (in which the (2′R,10′aS,10′bS)-2′-amino - 3′,6′ - dioxo - 10′b - hydroxy-2′ - methyloctahydrospiro[cyclohexane - 1,5′(8′H) - oxazolo[3,2-a]pyrrolo[2,1-c]pyrazine] which crystallizes during hydrogenation, has been dissolved), the methanolic solution is again concentrated to about 15 cc. at a bath temperature of 20° in a vacuum and (2′R,10′aS,10′bS)-2′-amino-3′,6′-dioxo-10′b-hydroxy - 2′ - methyloctahydrospiro[cyclohexane - 1,5′(8′H) - oxazolo[3,2 - a]pyrrolo[2,1-c]pyrazine] hydrochloride is made to crystallize by the addition of absolute ether. A crystalline powder, having a M.P. of 161–162° (decomp.), is obtained.

(1) Ergospironine.—2.0 g. of (2′R,10′aS, 10′bS)-2′-amino-3′,6′-dioxo-10′b-hydroxy - 2′ - methyloctahydrospiro[cyclohexane - 1,5′(8′H) - oxazolo[3,2 - a]pyrrolo-[2,1-c]pyrazine] hydrochloride and 3.75 g. of d-lysergic acid chloride hydrochloride are suspended in 70 cc. of absolute methylene chloride, the suspension is cooled to −10° and 30 cc. of absolute pyridine are subsequently added dropwise while stirring during the course of 5 minutes. The reaction mixture is allowed to react for half an hour in an ice bath and subsequently at 20° for 1 hour. 70 cc. of sodium carbonate solution and 50 cc. of methylene chloride are then added, the mixture is stirred for 10 minutes and the organic phase is separated. The aqueous-alkaline phase is again extracted twice with methylene chloride, the combined methylene chloride solutions are washed once with a dilute common salt solution, are dried and the solvent is removed. A brown foam is obtained, from which ergospironine may be crystallized with ethyl acetate. The mother liquor is chromatographed on a 50-fold quantity of aluminium oxide, activity I. Elution with methylene chloride yields some impure iso form of the ergospironine, which is obtained in pure form after a further chromatographic purification on silica gel and crystallization from methanol. Practically colourless needles having a M.P. of 230–231° (decomp.), $[\alpha]_D^{20} = +400°$ (c.=0.5, chloroform), are obtained.

Ergospironine is eluted from the column with methylene chloride containing 0.2% of methanol; this ergospironine, together with the ergospironine obtained by crystallization of the brown, foamy crude product from ethyl acetate, yields pure ergospironine after crystallization from methylene chloride/ethyl acetate. Rectangular parallelepipeds, joined in druses, which contain 1 mol of ethyl acetate of crystallization, which could not be removed even at 100° in a high vacuum. M.P. 185.5–186.5° (decomp.), $[\alpha]_D^{20} = -136°$ (c.=0.5, chloroform), Keller's colour reaction: deep blue.

Methane sulphonate: Rodlets from methylene chloride/ ethanol, M.P. 214–215° (decomp.), $[\alpha]_D^{20} = +123°$ (c.=1, ethanol/water 10:1).

EXAMPLE 2.—9,10-DIHYDROERGOSPIRONINE (Formula XVIII, 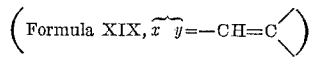)

2.2 g. of ergospironine in 50 cc. of undenatured alcohol and 20 cc. of methylene chloride are hydrogenated with 1 g. of palladium/aluminium oxide catalyst at room temperature and normal pressure until the taking up of hydrogen is completed (about 2 hours, amount of hydrogen taken up 90 cc.). After filtering off the catalyst, the filtrate is sucked off to dryness and the residue recrystallized from ethanol, whereby 9,10-dihydroergospironine is obtained as colourless rodlets having a M.P. of 188–189° (decomp.), $[\alpha]_D^{20} = +5°$ (c.=1, ethanol), Keller's colour reaction: violet blue.

Methane sulphonate: Fine needles from a small amount of water/ethanol, M.P. 228–229° (decomp.), $$[\alpha]_D^{20} = +14°$$

(c.=1, ethanol/water 9:1).

EXAMPLE 3.—5′-METHYLERGOALANINE (Formula XIX, 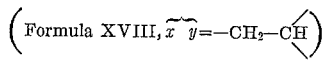)

(a) α-Methylalanine.—173 g. of potassium cyanide and 160 g. of ammonium chloride are suspended in 800 cc. of water, the mixture is heated to 50°, 174 g. of acetone are added dropwise at this temperature while stirring during the course of 15 minutes and the mixture is kept at 70° for a further hour to complete the reaction. Cooling is subsequently effected to 20° and the aminonitrile is saponified by carefully adding 1 liter of concentrated hydrochloric acid while cooling. After standing at 25° for 2 hours the reaction mixture is heated to the boil at reflux for a further 1½ hours. Working up is effected by evaporating the reaction mixture to dryness in a rotary evaporator and extracting the residue portionwise with a total of 2 liters of absolute ethanol. The so-obtained solution of the crude α-methylalanine hydrochloride is concentrated to about 1 liter, is diluted with 1 liter of water and gaseous ammonia is passed through the clear solution until it clearly gives an alkaline reaction (about pH 9). The solution is then strongly concentrated in a rotary evaporator, whereby α-methylalanine crystallizes. Repeated crystallization of the amino acid from a minimum amount of boiling water and purification of the mother liquors on Amberlite IR 120 yields pure α-methylalanine in the form of colourless plates having a M.P. of about 275°.

(b) α-Methylalanine ethyl ester.—This compound is produced from α-methylalanine under reaction conditions analogous to those used for the production of 1-aminocyclohexane - 1 - carboxylic acid methylester [see Example 1(c)]. Colourless oil, $n_D^{22} = 1.4140$, B.P. 44–45°/ 11 mm. Hg.

(c) (8aS)-3,3 - dimethyl - 1,4 - dioxooctahydropyrrolo [1,2-a]pyrazine.—110 g. of α-methylalanine ethyl ester and 209 g. of (2S)-N-benzyloxycarbonylproline are added to 500 cc. of methylene chloride and a solution of 206 g. of dicyclohexylcarbodiimide in 600 cc. of methylene chloride is added dropwise at 5° during the course of ten minutes. The reaction mixture is subsequently allowed to react at room temperature while stirring for 5 hours. Working up is effected by decomposing the excess dicyclohexylcarbodiimide by the addition of 20 cc. of glacial acetic acid and diluting the reaction mixture with 2 liters of ether. After removing the dicyclohexyl urea which crystallizes the filtrate is successively extracted with 2 N sulphuric acid, water, a potassium carbonate solution and again with water, the aqueous phases are shaken out twice more with ether, the combined ether solutions are dried and concentrated by evaporation. The residue of (2S)-1-(benzyloxycarbonyl) - N - (1-methyl-1-ethoxycarbonyl)ethyl-2-pyrrolidinecarboxylic acid amide does not crystallize and is further worked up as crude product. For this purpose 320 g. of (2S)-1-(benzyloxycarbonyl) - N - (1-methyl-1-ethoxycarbonyl)ethyl-2-pyrrolidinecarboxylic acid amide in 1.6 liters of ethyl acetate are hydrogenated with 65 g. of prehydrogenated palladium/active charcoal catalyst (5% Pd) at room temperature and normal pressure. After the taking up of hydrogen has been completed, the catalyst is filtered off and the solvent is evaporated, whereby a yellow viscous oil, mainly consisting of (2S)-N-(1-methyl-1-ethoxycarbonyl)ethyl-2-pyrrolidinecarboxylic acid amide, is obtained; as this cannot be crystallized, it is cyclized as crude product to give (8aS)-3,3-dimethyl-1,4-dioxooctahydropyrrolo [1,2-a]pyrazine, 5 cc. (about 10 mole percent) of glacial acetic acid are added to the oily (2S)-N-(1-methyl - 1 - ethoxycarbonyl)ethyl - 2 - pyrrolidinecarboxylic acid amide and heating is effected in a water jet vacuum to 130–140° for 1 hour. After about 40 minutes the formed (8aS)-3,3-dimethyl - 1,4 - dioxooctahydropyrrolo[1,2-a]pyrazine already starts to crystallize. A crystalline crude product is thus obtained, from which an approximately 90 to 95% optically pure (8aS)-3,3-dimethyl-1,4-dioxooctahydropyrrolo[1,2-a]pyrazine is obtained by crystallization from methylene chloride/isopropyl ether. Rectangular prisms having a M.P. of 152–156°, $[\alpha]_D^{20} = -152°$ (c.=1, ethanol).

(d) (2R,10aS,10bS) - 2 - ethoxycarbonyl-3,6-dioxo-10b-hydroxy - 2,5,5 - trimethyloctahydro - 8H - oxazolo[3,2-a]pyrrolo[2,1-c]pyrazine.—60.2 g. of approximately 90 to 95% optically pure (8aS)-3,3-dimethyl-1,4-dioxooctahydropyrrolo[1,2-a]pyrazine and 26.1 g. of absolute pyridine are suspended in 50 cc. of absolute dioxane, the mixture is cooled to +5° and 89.3 g. of S(+)-2-methyl-2-benzyloxy-malonic acid chloride monoethyl ester are added dropwise at this temperature while stirring during the course of 10 minutes. The temperature is then allowed to rise to 20° and the reaction mixture is stirred for 30 minutes. The temperature is then raised to 80° and stirring is effected for a further 1½ hours. After cooling to room temperature the mixture is diluted with ether and successively extracted with a sodium hydrogen carbonate solution, water 2 N hydrochloric acid and again water, and after drying and removing the solvent a viscous, slightly yellow coloured oil results, which is further worked up without purification. For this purpose (8aS,αS)-2-(α-ethoxycarbonyl - α - benzyloxypropionyl)-3,3-dimethyl-1,4-dioxooctahydropyrrolo[1,2-a]pyrazine is dissolved in 1 liter of undenatured alcohol and is catalytically hydrogenated with 25 g. of prehydrogenated palladium/active charcoal catalyst (5% Pd) at normal pressure and a temperature of 45°. After 7.3 liters of hydrogen have been taken up during the course of 18 hours, hydrogen is no longer taken up, so that the catalyst is filtered off and the solvent removed in a vacuum. After crystallization from diisopropyl ether the residue yields (2R,10aS,10bS)-2-ethoxycarbonyl-3,6-dioxo-10b-hydroxy - 2,5,5 - trimethyloctahydro-8H-oxazolo[3,2-a]pyrrolo[2,1-c]pyrazine having a M.P. of 108–111° and a mother liquor which yields a further amount of (2R,10aS,10bS) - 2 - ethoxycarbonyl-3,6-dioxo - 10b - hydroxy-2,5,5-trimethyl-octahydro-8H-oxazolo [3,2-a]pyrrolo[2,1-c]pyrazine, having a M.P. of 109–111°, after filtration through a 5-fold quantity of aluminium oxide, activity I. A sample of this compound is recrystallized from diisopropyl ether until the M.P. is constant. M.P. 111–113°, prisms joined in druses, $[\alpha]_D^{20} = +42.7°$ (c.=1, ethanol), $pK^+_{MCS} = 10.8$.

(e) (2R,10aS, 10bS) - 2 - carboxy - 3,6 - dioxo-10b-hydroxy - 2,5,5 - trimethyloctahydro - 8H-oxazolo[3,2-a]pyrrolo[2,1-c]pyrazine.—69 g. of (2R,10aS,10bS) - 2-ethoxycarbonyl - 3,6 - dioxo - 10b - hydroxy - 2,5,5-trimethyloctahydro - 8H - oxazolo[3,2-a]pyrrolo[2,1-c]pyrazine are dissolved at 0° in 210 cc. of a 2 N sodium hydroxide solution, whereby the temperature rises to 20°. After standing at 20° for 2 hours the somewhat turbid solution is filtered through active charcoal and the pH of the resulting clear and colourless solution is adjusted to 1.5 with about 105 cc. of 4 N hydrochloric acid, whereby (2R,10aS,10bS) - 2 - carboxy - 3,6 - dioxo-10b-hydroxy-2,5,5 - trimethyloctahydro-8H-oxazolo[3,2-a]pyrrolo[2,1-c]pyrazine immediately starts to crystallize. After cooling to 0° the crystalline precipitate is filtered off, washed with water and dried in a high vacuum at 20°, whereby (2R,10aS,10bS)-2-carboxy-3,6-dioxo - 10b - hydroxy-2,5,5-trimethyloctahydro - 8H - oxazolo[3,2-a]pyrrolo[2,1-c]pyrazine, having a M.P. of 146–147° (decomp.), is obtained. The mother liquor is reduced to half its volume, 10% common salt is dissolved therein and the solution is again made to crystallize in an ice bath, whereby a further amount of (2R,10aS,10bS)-2-carboxy-3,6-dioxo-10b - hydroxy - 2,5,5 - trimethyloctahydro-8H-oxazolo[3,2-a]pyrrolo[2,1-c]pyrazine, having a M.P. of 143–144°, is obtained. $[\alpha]_D^{20} = +56°$ (c.=1, ethanol).

(f) (2R,10aS,10bS) - 2 - chloroformyl - 3,6-dioxo-10b-hydroxy - 2,5,5 - trimethyloctahydro - 8H - oxazolo[3,2-a]pyrrolo[2,1-c]pyrazine.—20.8 g. of freshly sublimated, finely pulverized phosphorus pentachloride are dissolved in 250 cc. of absolute ether at 25–35°, 125 cc. of absolute petroleum ether are added to the solution and cooling is effected to +5°. 14.9 g. of high vacuum dried, finely pulverized (2R,10aS,10bS) - 2 - carboxy-3,6-dioxo-10b - hydroxy - 2,5,5 - trimethyloctahydro-8H-oxazolo[3,2-a]pyrrolo[2,1-c]pyrazine are then added to the solution and the mixture is stirred in an ice bath for 2½ hours. The (2R,10aS,10bS) - 2 - chloroformyl-3,6-dioxo-10b - hydroxy - 2,5,5- - trimethyloctahydro-8H-oxazolo[3,2-a]pyrrolo[2,1-c]pyrazine which crystallizes is filtered off, is again washed with 100 cc. of a mixture of ether/petroleum ether in a ratio per volume of 1:1 and is dried in a high vacuum at 20°, whereby the crude acid chloride, having a great liability to decomposition and a M.P. of 115–116° (decomp.) is obtained. $[\alpha]_D^{20} = +61°$ (c.=1, methylene chloride).

(g) (2R,10aS,10bS) - 2 - azidocarbonyl - 3,6-dioxo-10b - hydroxy - 2,5,5 - trimethyloctahydro-8H-oxazolo[3,2 - a]pyrrolo[2,1 - c]pyrazine. — 15.1 g. of (2R,10aS, 10bS) - 2 - chloroformyl - 3,6-dioxo-10b-hydroxy-2,5,5-trimethyloctahydro - 8H - oxazolo[3,2-a]pyrrolo[2,1-c]pyrazine are dissolved in 150 cc. of absolute methylene chloride, the solution is cooled to 0° and a solution of 7.7 g. of sodium azide in 25 cc. of water is added while mixing vigorously with a vibromixer. After mixing for three minutes, 25 cc. of a 20% potassium hydrogen carbonate solution are added and mixing is effected for a further minute. The two phases are separated in a separating funnel and the methylene chloride phase is immediately dried over sodium sulphate. The aqueous phase is again extracted with 100 cc. of methylene chloride. The combined methylene chloride extracts are dried and such an amount of methylene chloride is distilled off in a vacuum at 20° that the material still remains in solution. The concentrated solution is then diluted with 100 cc. of absolute ether, whereby the azide rapidly crystallizes. After cooling of 0° filtration is effected, the precipitate is washed well with absolute ether and dried in a high vacuum at 20°, whereby (2R,10aS,10bS)-2-azidocarbonyl) - 3,6 - dioxo - 10b-hydroxy-2,5,5-trimethyloctahydro-8H-oxazolo[3,2-a]pyrrolo[2,1-c]pyrazine, having a M.P. of 105° (decomp.), $[\alpha]_D^{20} = +41°$ (c.=1.7, methylene chloride), is obtained.

(h) (2R,10aS,10bS) - 2 - benzyloxycarbonylamino-3,6-dioxo-10b-hydroxy-2,5,5 - trimethyloctahydro-8H-oxazolo[3,2 - a]pyrrolo[2,1 - c]pyrazine. — 13.2 g. of (2R,10aS, 10bS) - 2 - azidocarbonyl - 3,6 - dioxo-10b-hydroxy-2,5,5-trimethyloctahydro - 8H - oxazolo[3,2-a]pyrrolo[2,1-c]pyrazine are dissolved in 130 cc. of absolute chloroform, 8.9 g. of absolute benzyl alcohol are added and the mixture is heated to the boil at reflux for 30 minutes. The chloroform is then removed and the crystalline residue is recrystallized from ethanol, whereby some impure (2R,10aS,10bS) - 2 - benzyloxycarbonylamino-3,6-dioxo-10b - hydroxy - 2,5,5 - trimethyloctahydro-8H-oxazolo[3,2-a]pyrrolo[2,1-c]pyrazine is obtained, which is obtained in pure form after crystallizing once more from ethanol/hexane. Colourless needles having a M.P. of 232–233° (decomp.), $[\alpha]_D^{20} = +47.2°$ (c.=1, ethanol).

(i) (2R,10aS,10bS)-2-amino-3,6-dioxo - 10b - hydroxy-2,5,5-trimethyloctahydro - 8H - oxazolo[3,2-a]pyrrolo[2, 1-c]pyrazine hydrochloride.—5 g. of palladium chloride are hydrogenated in 100 cc. of absolute tetrahydrofuran in which 128 mg. of gaseous hydrochloric acid has been dissolved, until the taking up of hydrogen is completed (about 20 minutes, amount of hydrogen taken up 850 cc.). A solution of 16 g. of (2R,10aS,10bS)-2-benzyloxycarbonylamino - 3,6 - dioxo - 10b-hydroxy-2,5,5-trimethyloctahydro - 8H - oxazolo[3,2-a]pyrrolo[2,1-c]pyrazine in 250 cc. of absolute tetrahydrofuran is added to the so-prepared suspension of the catalyst and hydrogenation is effected at room temperature and normal pressure. 800 cc. of hydrogen are taken up in the course of 80 minutes, the reaction is completed and most of the (2R,10aS,10bS)-2-amino - 3,6 - dioxo - 10b-hydroxy-2,5,5-trimethyloctahydro - 8H - oxazolo[3,2-a]pyrrolo[2,1-c]pyrazine hydrochloride crystallizes. After allowing the reaction mixture to stand in an ice bath filtration is effected, the precipitate is washed with ether and dried at 20° in a high vacuum, whereby a grey powder results, which consists of metallic palladium and (2R,10aS,10bS)-2-amino-3,6 - dioxo - 10b - hydroxy-2,5,5-trimethyloctahydro-8H-oxazolo[3,2-a]pyrrolo[2,1-c]pyrazine hydrochloride, containing 1 mole of tetrahydrofuran of crystallization, and is used as such for the condensation with d-lysergic acid chloride hydrochloride.

(j) 5'-methylergoalanine, 5'-methylergoalaninine.—13 g. of crude (2R,10aS,10bS)-2-amino-3,6-dioxo-10b-hydroxy - 2,5,5 - trimethyloctahydro-8H-oxazolo[3,2-a]pyrrolo[2,1-c]pyrazine hydrochloride and 20.5 g. of d-lysergic acid chloride hydrochloride are suspended in 250 cc. of absolute methylene chloride, the suspension is cooled to —10° and 110 cc. of pyridine are added dropwise at —10° while stirring during the course of 10 minutes. The reaction mixture is subsequently allowed to react at 0° for ½ hour and then at 20° for 1½ hours. For purposes of working up 3 g. of active charcoal are added, filtration is effected, and the filtrate is diluted with methylene chloride and shaken out with potassium carbonate solution. The potassium carbonate solution is again extracted twice with methylene chloride, the combined methylene chloride solutions are washed with water, dried with sodium sulphate, the solvent is removed in a vacuum and the resulting mixture of crude bases is chromatographed on a 40-fold quantity of aluminum oxide, activity I. 5'-methylergoalaninine is washed from the column with methylene chloride containing 0.1 to 0.2% of methanol and is crystallized from methylene chloride/methanol. Colourless needles, M.P. 236° (decomp.), $$[\alpha]_D^{20} = +435°$$

(c.=0.4 in chloroform), Keller's colour reaction: blue.

5'-methylergoalanine is eluted from the column with methylene chloride containing 0.2 to 0.5% of methanol, and is further purified by crystallization from methylene chloride/ethanol. Colourless rodlets, M.P. 231° (decomp.), $[\alpha]_D^{20} = -14°$ (c.=0.5 in chloroform containing 5% of methanol).

5'-methylergoalanine methane sulphonate: Druses or rodlets from methanol/ethyl acetate, M.P. 232° (decomp.), $[\alpha]_D^{20} = +115°$ (c.=0.6 in water).

EXAMPLE 4.—9,10-DIHYDRO-5'-METHYLERGOALANINE

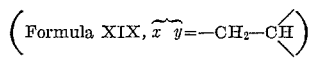
(Formula XIX, $\overset{\frown}{x\ y}$=—CH₂—CH)

4 g. of 5'-methylergoalanine are hydrogenated in a mixture of 175 cc. of ethanol and 175 cc. of methylene chloride with 4 g. of palladium/aluminium oxide catalyst (5% Pd) at room temperature and normal pressure until the taking up of hydrogen is completed (about 1½ hours, quantity of hydrogen taken up 170 cc.). After removing the catalyst the filtrate is concentrated to somewhat less than half its original volume, whereby most of the very difficultly soluble product crystallizes. The precipitated crystals are again recrystallized from methylene chloride/ethanol, whereby pure 9,10-dihydro-5'-methylergoalanine results in the form of colourless prisms having a M.P. of 272° (decomp.), $[\alpha]_D^{20} = +27°$ (c.= 0.5 in methylene chloride/methanol 3:1), Keller's colour reaction: violet blue.

Methane sulphonate: Short rodlets from methanol/ ethyl acetate, M.P. 246° (decomp.), $[\alpha]_D^{20} = +24.5°$ (c.=0.5 in 90% ethanol).

EXAMPLE 5.—5'-METHYL-9,10-DIHYDRO-ERGOTAMINE (a) Racemic α-methylphenylalanine.—40.3 g. of benzylmethylketone are added dropwise while stirring to a solution of 20.2 g. of potassium cyanide and 16.1 g. of ammonium chloride in 87 cc. of distilled water and the mixture is stirred at 55–60° for 6 hours, whereby the initially colourless emulsion gradually takes a brown colour. After standing at 20° overnight the reaction solution is made alkaline with solid potassium carbonate and extracted thrice with 400 cc. each of ether. The combined ether solutions are again washed with dilute common salt solution, are dried and the solvent is removed in a vacuum, whereby crude 2-benzyl-2-amino-propionitrile results as a red oil. 46.8 g. of the nitrile are subsequently dissolved in a mixture of 470 cc. of concentrated hydrochloric acid and 470 cc. of distilled water while cooling and the mixture is heated to the boil at reflux overnight, whereby a yellow, slightly turbid solution results, which is evaporated to dryness in a rotary evaporator. The resulting crude hydrochloride of racemic α-methylphenylalanine is dissolved in 1½ liters of water while heating and chromatographed on a column of 1 liter of Amberlite IR–120 (H⁺ form). After washing the column until neutral by allowing 5 liters of water to flow through, it is neutralized with ice-cold 2 N ammonia, whereby after concentrating the eluate by evaporation a crude product is obtained, which yields pure racemic α-methylphenylalanine having a M.P. of 294–295° (decomp.) after recrystallization from hot methanol.

(b) Separation into the antipodes: (αS)(+)-α-methylphenylalanine.—17.9 g. of racemic α-methylphenylalanine and 23.2 g of (+)-camphor-10-sulphonic acid are dissolved in 100 cc. of ethanol while hot, the solution is cooled, is strongly diluted with ethyl acetate, is inoculated with (αS)(+) - α-methylphenylalanine-(+)-camphor-10-sulphonate and allowed to crystallize at 20°. After filtering off the precipitated salt the mother liquor is concentrated in a rotary evaporator and again diluted with ethyl acetate, whereby a further crystalline fraction may be obtained. After recrystallizing twice from ethanol/ethyl acetate the combined crystalline products yield pure (αS) (+) - α - methylphenylalanine-(+)-camphor-10-sulphonate having a M.P. of 140–142°, $[\alpha]_D^{20} = +32.5°$ (c.= 1.5 in ethanol).

241 g. of this (αS)(+)-α-methylphenylalanine-(+)-camphor-10-sulphonate are split into the components in aqueous solution on a column of 600 cc. of Amberlite IR–120. After 143 g. of camphor-10-sulphonic acid have been washed from the column by elution with water, the (αS)(+)-α-methylphenylalanine which still contains some water is eluted as ammonium salt with ice-cold, 1 N ammonia solution, and the crystalline, still somewhat moist free amino acid is obtained by concentrating the solution by evaporation. After crystallization from methanol pure (αS)(+)-α-methylphenylalanine is obtained therefrom. M.P. about 300° (sublimated), $[\alpha]_D^{20} = -20°$ (c.=1 in water).

(c) (αS)-α-methylphenylalanine methyl esters.—63 g. of (αS)(+)-α-methylphenylalanine are suspended in 800 cc. of absolute methanol and gaseous hydrochloric acid is passed through the suspension while stirring until the solution is saturated. This solution is heated to the boil at reflux for 2½ hours and is subsequently concentrated in a rotary evaporator. The residue is shaken out as quickly as possible between an ice-cold potassium carbonate solution and methylene chloride and the aqueous phase is again extracted twice with methylene chloride. After washing the combined methylene chloride phases with a common salt solution and drying with sodium sulphate the methylene chloride is removed in a rotary evaporator at 50° and the residue, a yellow oil, is distilled in a high vacuum. (αS)-α-methylphenylalanine methyl ester distils at 73–74°/0.01 mm. Hg., $n_D^{23}=1.5115$, $[\alpha]_D^{20}=+5.7°$ (c.=2, ethanol).

(d) (3S,8aS)-3-benzyl-1,4-dioxo-3-methyloctahydropyrrolo[1,2-a]pyrazine.—81 g. of (2S)-N-benzyloxycarbonylproline are dissolved in 200 cc. of absolute ether, a solution of 63 g. of (αS)-α-methylphenylalanine methyl ester in 100 cc. of absolute ether is added at 20° and a solution of 84 g. of dicyclohexylcarbodiimide in 200 cc. of absolute ether is added dropwise at 10 to 15° while cooling and stirring vigorously. The resulting suspension is first stirred for a further 2 hours at 10 to 15° and is then allowed to stand overnight. The precipitated dicyclohexyl urea is then filtered off, washed with absolute ether and the combined ether solutions are successively extracted with cold, dilute phosphoric acid, water, potassium hydrogen carbonate solution and again water. The aqueous phases are again washed twice with ether, the combined ether solutions are dried and the ether evaporated, whereby crude (2S,αS)-1-(benzyloxycarbonyl)-N-(α-methyl - α - methoxycarbonyl)phenethyl-2-pyrrolidinecarboxylic acid amide is obtained in the form of a light yellow, viscous oil. 141 g. of this crude product are dissolved in 1.1 liters of glacial acetic acid and catalytic hydrogenation is effected at 20° with 40 g. of palladium/active charcoal catalyst with occasional evacuation (to remove the carbon dioxide which results during hydrogenation). After 4 hours 5.5 liters of hydrogen have been taken up, the reaction is completed. The catalyst is filtered off and most of the glacial acetic acid is removed in a rotary evaporator. The residue which consists of (2S,αS)-N-(α-methyl - α - methoxycarbonyl)phenethyl-2-pyrrolidinecarboxylic acid amide is taken up in methylene chloride, shaken out with sodium hydrogen carbonate solution, washed with water, dried and the solvent removed, whereby a yellow oil is obtained.

(2S,αS)-N-(α-methyl - α - methoxycarbonyl)phenethyl-2-pyrrolidinecarboxylic acid amide is cyclized to (3S,8aS)-3-benzyl-1,4-dioxo-3-methyloctahydropyrrolo[1,2-a]pyrazine by adding 2 cc. of glacial acetic acid to the crude product and heating to 120° in a vacuum for 1 hour. After about 45 minutes (3S,8aS)-3-benzyl-1,4-dioxo-3-methyloctahydropyrrolo[1,2-a]pyrazine already starts to crystallize. This crude product is further purified by crystallization from ethyl acetate/isopropyl ether, whereby fine needles having a M.P. of 159–161°, are obtained. A further amount of (3S,8aS)-3-benzyl-1,4-dioxo-3-methyloctahydropyrrolo[1,2-a]pyrazine may be obtained from the mother liquors; this may be combined with the first fraction, and after recrystallizing once more from ethyl acetate/isopropyl ether, yields pure lactam having a M.P. of 160–162°. A sample recrystallized a further twice from ethyl acetate/isopropyl ether has a M.P. of 161–162°, $[\alpha]_D^{20}=-30.4°$ (c.=1.5, water), $[\alpha]_D^{20}=-42.80$ (c.=2, ethanol).

(e) (3H,8aS,αS) - 2 - (α-ethoxycarbonyl-α-benzyloxypropionyl)-3-benzyl - 1,4 - dioxo-3-methyloctahydropyrrolo[1,2-a]pyrazine.—40 g. of (3S,8aS)-3-benzyl-1,4-dioxo-3-methyloctahydropyrrolo[1,2-a]pyrazine are added to 25 cc. of absolute dioxane and 16 cc. of absolute pyridine and the mixture is cooled to 10°. 46 g. of S(+)-2-methyl-2-benzyloxy-malonic acid chloride monoethyl ester are then added dropwise at 10° while stirring during the course of 10 minutes and the mixture is stirred at 20° for 1 hour and then at 60° for 4 hours. Working up is effected by cooling the mixture to 10° and adding an excess of ice-cold dilute phosphoric acid. Immediately thereafter extraction is effected thrice with ether, the combined ether solutions are successively washed with water, a saturated sodium hydrogen carbonate solution and again water, the ether solutions are dried with sodium sulphate and the solvent removed. After crystallizing once from diisopropyl ether the crystalline residue yields (3S,8aS,αS) - 2 - (α-ethoxycarbonyl-α-benzyloxypropionyl)-3-benzyl-1,4-dioxo - 3 - methyloctahydropyrrolo[1,2-a]pyrazine having a M.P. of 117–119°; a further amount of compound having the same M.P. may be obtained from the mother liquor. A sample recrystallized twice more from methylene chloride/diisopropyl ether has a M.P. of 118–119°, $[\alpha]_D^{20}=+141°$ (c.=1, ethanol), colourless, elongated prisms.

(f) (2R,5S,10aS,10bS)-2-ethoxycarbonyl-5-benzyl-2,5-dimethyl-3,6-dioxo - 10b - hydroxyoctahydro-8H-oxazolo-[3,2-a]pyrrolo[2,1-a]pyrazine.—61 g. of (3S,8aS,αS)-2-(α - ethoxycarbonyl-α-benzyloxypropionyl)-3-benzyl-1,4-dioxo-3-methyloctahydropyrrolo[1,2-a]pyrazine are hydrogenated in a solution of 450 cc. of glacial acetic acid and 200 cc. of water with 40 g. of prehydrogenated palladium/active charcoal catalyst at 20° and normal pressure. After 2.9 liters of hydrogen have been taken up the reaction is completed. Working up is effected by filtering off the catalyst, removing the solvent, taking up the residue in ethyl acetate, extracting with 10% potassium hydrogen carbonate solution, washing with dilute common salt solution and evaporating the solvent in a vacuum. After crystallization from ethyl acetate/isopropyl ether the residue yields (2R,5S,10aS,10bS)-2-ethoxycarbonyl-5-benzyl-2,5-dimethyl - 3,6-dioxo-10b-hydroxyoctahydro-8H-oxazolo[3,2-a]pyrrolo[2,1-c]pyrazine having a M.P. of 115–117° (an isomorphous form of the ester crystallizes from the same solvent mixture in obliqueangled plates and has a M.P. of 108–110°), rectangular prisms, $[\alpha]_D^{20}=+70°$ (c.=1, ethanol).

(g) (2R,5S,10aS,10bS) - 5 - benzyl - 2 - carboxy-2,5-dimethyl - 3,6 - dioxo-10b-hydroxyoctahydro-8H-oxazolo-[3,2-a]pyrrolo[2,1-c]pyrazine.—20 g. of (2R,5S,10aS,10bS) - 2 - ethoxycarbonyl - 5 - benzyl-2,5-dimethyl-3,6-dioxo - 10b - hydroxyoctahydro - 8H - oxazolo[3,2-a]pyrrolo[2,1-c]pyrazine are dissolved in 110 cc. of 1 N sodium hydroxide solution and 10 cc. of ethanol and the solution is stirred at 20° for 2 hours. Some active charcoal is then added and after filtering through Hyflo acidification is effected with 110 cc. of 1 N hydrochloric acid (pH about 2), whereby (2R,5S,10aS,10bS)-5-benzyl-2-carboxy - 2,5 - dimethyl - 3,6 - dioxo-10b-hydroxyoctahydro-8H-oxazolo[3,2-a]pyrrolo[2,1 - c]pyrazine crystallizes. After standing for 1 hour in an ice bath filtration is effected and the crystals are dried in a high vacuum at 20°. (2R,5S,10aS,10bS) - 5 - benzyl-2-carboxy-2,5-dimethyl-3,6-dioxo - 10b - hydroxyoctahydro-8H-oxazolo[3,2-a] pyrrolo[2,1-c]pyrazine dihydrate has a M.P. of 143° (decomp.). After recrystallization from acetone until a constant M.P. is obtained (2R,5S,10aS,10bS) - 5 - benzyl-2-carboxy-2,5-dimethyl - 3,6 - dioxo - 10b - hydroxyoctahydro - 8H - oxazolo[3,2-a]pyrrolo[2,1-c]pyrazine monohydrate has a M.P. of 144° (decomp.), $[\alpha]_D^{20}=+65°$ (c.=1, ethanol), $pK^+_{MCS}=3.99$.

(h) (2R,5S,10aS,10bS) - 5 - benzyl - 2 - chloroformyl-2,5-dimethyl - 3,6 - dioxo - 10b - hydroxyoctahydro-8H-oxazolo[3,2-a]pyrrolo[2,1-c]pyrazine.—5.85 g. of freshly sublimated phosphorus pentachloride are dissolved in 125 cc. of absolute ether by stirring for 1 hour at room temperature and 5.0 g. of (2R,5S,10aS,10bS) - 5 - benzyl-2-carboxy - 2,5 - dimethyl - 3,6 - dioxo-10b-hydroxyoctahydro - 8H - oxazolo[3,2-a]pyrrolo[2,1-c]pyrazine monohydrate are added to the solution. A clear solution is obtained as intermediate, whereupon (2R,5S,10aS,10bS)-5-benzyl - 2 - chloroformyl-2,5-dimethyl-3,6-dioxo-10b-hydroxyoctahydro - 8H - oxazolo[3,2-a]pyrrolo[2,1-c] pyrazine starts to crystallize. After stirring for half an hour 125 cc. of absolute petroleum ether are added to the reaction mixture and stirring is again effected for half an hour in an ice bath. After filtering off the acid chloride which crystallizes, this is washed well with petroleum ether, and dried at 20°, whereby (2R,5S,10aS,10bS)-5-benzyl-2-chloroformyl-2,5-dimethyl - 3,6 - dioxo-10b-hydroxyoctahydro - 8H - oxazolo[3,2-a]pyrrolo[2,1-c]pyrazine, having a M.P. of 126–127° (decomp.), is obtained. The combined filtrates are strongly concentrated in a vacuum, whereby a second fraction of (2R,5S,10aS,10bS)-5-benzyl-2-chloroformyl - 2,5 - dimethyl - 3,6 - dioxo -10b-hydroxyoctahydro - 8H - oxazolo[3,2-a]pyrrolo[2,1-c] pyrazine is obtained. $[\alpha]_D^{20}=+64°$ (c.=0.2 in methylene chloride).

(i) (2R,5S,10aS,10bS) - 2 - azidocarbonyl - 5 - benzyl-2,5 - dimethyl - 3,6 - dioxo - 10b - hydroxyoctahydro-8H-oxazolo[3,2-a]pyrrolo[2,1-c]pyrazine.—A solution of 4.46 g. of (2R,5S,10aS,10bS) - 5 - benzyl-2-chloroformyl-2,5-dimethyl - 3,6 - dioxo - 10b - hydroxyoctahydro-8H-oxazolo[3,2-a]pyrrolo[2,1-c]pyrazine in 45 cc. of absolute chloroform is cooled to 0° and a solution of 1.85 g. of sodium azide in 5 cc. of water is added while mixing vigorously with a vibro-stirrer, whereby the temperature rises to +5°. After mixing for a further 5 minutes 10 cc. of a 20% potassium hydrogen carbonate solution are added, mixing is effected for a further minute, the organic phase is separated and the aqueous phase is extracted twice with 50 cc. each of absolute methylene chloride. The chloroform solution and the two methylene chloride solutions are combined, washed once with 50 cc. of common salt solution, dried well with sodium sulphate and concentrated to the consistency of a syrup at 20° in a vacuum. After diluting with absolute ether (2R,5S,10aS, 10bS))-2-azidocarbonyl - 5 - benzyl - 2,5 - dimethyl-3,6-dioxo-10b-hydroxyoctahydro - 8H - oxazolo[3,2-a]pyrrolo[2,1-c]pyrazine, having a M.P. of 100° (decomp.), crystallizes therefrom. $[\alpha]_D^{20}=+144°$ (c.=0.8 in methyene chloride).

(j) (2R,5S,10aS,10bS) - 5 - benzyl - 2 - benzyloxycarbonylamino - 2,5 - dimethyl - 3,6 - dioxo-10b-hydroxyoctahydro - 8H - oxazolo[3,2-a]pyrrolo[2,1-c]pyrazine.—3.7 g. of (2R,5S,10aS,10bS) - 2 - azidocarbonyl-5-benzyl-2,5-dimethyl - 3,6 - dioxo - 10b - hydroxyoctahydro-8H-oxazolo[3,2-a]pyrrolo[2,1-c]pyrazine are dissolved in 40 cc. of absolute chloroform, 2.0 g. of absolute benzyl alcohol and 1 drop of concentrated hydrochloric acid are added and the mixture is heated to the boil at reflux for half an hour. After removing the chloroform in a vacuum the residue is dissolved in a mixture of methylene chloride and ethyl acetate, active charcoal is added, filtration through Hyflo and dilution with ether are effected, whereby (2R,5S,10aS,10bS) - 5 - benzyl - 2 - benzyloxycarbonylamino-2,5-dimethyl - 3,6 - dioxo - 10b - hydroxyoctahydro-8H - oxazolo[3,2-a]pyrrolo[2,1-c]pyrazine crystallizes in the form of prisms joined in druses, having a M.P. of 221° (decomp.), $[\alpha]_D^{20}=+91°$ (c.=1, ethanol).

(k) (2R,5S,10aS,10bS) - 2 - amino - 5 - benzyl-2,5-dimethyl-3,6-dioxo-10b-hydroxyoctahydro - 8H - oxazolo-[3,2-a]pyrrolo[2,1-c]pyrazine hydrochloride.—565 mg. of anhydrous palladium chloride are suspended in 10 cc. of absolute tetrahydrofuran containing 200 mg. of gaseous hydrochloric acid and prehydrogenation is effected as long as a taking up of hydrogen is still observed. A solution of 2.0 g. of (2R,5S,10aS,10bS) - 5 - benzyl-2-benzyloxycarbonylamino - 2,5 - dimethyl-3,6-dioxo-10b-hydroxyoctahydro-8H-oxazolo[3,2-a]pyrrolo[2,1-c]pyrazine in 50 cc. of tetrahydrofuran is added to the suspension of the resulting palladium and hydrogenation is effected at room temperature. After hydrogenating for 1 hour 60 cc. of hydrogen have been taken up and the reaction is completed. In order to crystallize the resulting (2R,5S,10aS,10bS)-2-amino - 5 - benzyl - 2,5 - dimethyl - 3,6 - dioxo-10b-hydroxyoctahydro - 8H - oxazolo[3,2-a]pyrrolo[2,1-c]-pyrazine hydrochloride as completely as possible, the reaction mixture is subsequently kept in an ice bath for 45 minutes, whereby after filtering and carefully drying in a vacuum a grey powder is obtained, consisting of (2R,5S, 10aS,10bS)-2-amino - 5 - benzyl-2,5-dimethyl-3,6-dioxo-10b - hydroxyoctahydro - 8H - oxazolo[3,2-a]pyrrolo-[2,1-c]pyrazine hydrochloride and metallic palladium. After recrystallization from tetrahydrofuran/ether the mother liquor yields a further amount of (2R,5S,10aS, 10bS)-2-amino - 5 - benzyl - 2,5-dimethyl-3,6-dioxo-10b-hydroxyoctahydro - 8H - oxazolo[3,2-a]pyrrolo[2,1-c] pyrazine hydrochloride having a M.P. of 174–175° (decomp.).

(1) 5'-methyl-9,10-dihydroergotamine.—A mixture of 40 cc. of absolute acetonitrile and 50 cc. of absolute dimethylformamide is cooled to −15°, 9 g. of 9,10-dihydrolysergic acid chloride hydrochloride are added and 40 cc. of absolute pyridine are added dropwise at −15° while stirring during the course of 5 minutes, whereby a thick, brown mash is formed. 5.28 g. of (2R,5S,10aS,10bS)-2-amino-5-benzyl-2,5-dimethyl-3,6-dioxo - 10b - hydroxyoctahydro - 8H - oxazolo[3,2-a]pyrrolo[2,1-c]pyrazine hydrochloride are then added to this mixture, and the reaction mixture is further stirred for 1½ hours, whereby the temperature is gradually allowed to rise to 0°. For purposes of working up the reaction mixture is poured into 150 cc. of 2 N hydrochloric acid which contains approximately the same amount of ice, the mixture is stirred well, is then made alkaline with 200 cc. of a 2 N sodium carbonate solution and is extracted 5 times with methylene chloride containing some methanol so as to more readily dissolve the 5'-methyl-9,10-dihydroergotamine. The combined organic phases are first washed with an aqueous ammonia solution, then with a 15% common salt solution, are dried with sodium sulphate and the solvent is removed. The still adhering residues of pyridine and dimethylformamide are removed by suspending the residue twice in toluene and distilling this to dryness in a rotary evaporator. A yellow foam is obtained, which is chromatographed on a 30-fold quantity of aluminium oxide, activity I. 5'-methyl-9,10-dihydroergotamine is eluted with methylene chloride containing 0.3 to 0.5% of methanol and is further purified by crystallization from ethyl acetate. Colourless, short needles joined in druses, having a M.P. of 195–196° (decomp.), $[\alpha]_D^{20}=+53°$ (c.=0.8 in ethanol), $[\alpha]_D^{20}=+66°$ (c.=0.9 in chloroform).

EXAMPLE 6.—5-METHYLERGOTAMINE 10.0 g. of (2R,5S,10aS,10bS)-2-amino - 5 - benzyl-2,5-dimethyl-3,6-dioxo - 10b - hydroxyoctahydro-8H-oxazolo-[3,2-a]pyrrolo[2,1-c]pyrazine hydrochloride and 14.5 g. of d-lysergic acid chloride hydrochloride are added to 100 cc. of absolute methylene chloride which has been cooled to −10°. 17.9 cc. of absolute pyridine are then added dropwise to this suspension at −10° while stirring well during the course of 15 minutes and the brown suspension is subsequently stirred first at 0° for half an hour and then at 20° for 3 hours. Working up is effected by diluting with 100 cc. of methylene chloride and 19 cc. of pyridine and subsequently decomposing with 100 cc. of a 2 N sodium carbonate solution. Working up is facilitated by adding a further 19 cc. of pyridine and extracting this solution 4 times with 300 cc. each of methylene chloride. The combined methylene chloride solutions are washed once with 120 cc. of dilute common salt solution, are dried and the solvent is removed in a vacuum. The pyridine is completely removed by suspending the residue twice in 50 cc. each of absolute toluene and removing this in a rotary evaporator. The resulting light brown foam is then dried at 80° in a high vacuum for 1 hour. The residue is subjected to column chromatography on a 50-fold quantity of aluminium oxide, activity I, whereby 5'-methylergotaminine is eluted from the column with methylene chloride containing 0.1% of methanol and is further purified by crystallization from methanol. Colourless, hexagonal leaflets having an M.P. of 237–238° (decomp.), $[\alpha]_D^{20}=+435°$ (c.=0.5, pyridine). 5'-methylergotamine is washed from the column with methylene chloride containing 0.5 to 0.7% of methanol. After crystallization from methanol colourless massive elongated prisms having a M.P. of 182–184° (decomp.), are obtained. $[\alpha]_D^{20}=+112°$ (c.=0.5, pyridine), $[\alpha]_D^{20}=-51°$ (c.=0.5, chloroform).

EXAMPLE 7.—1,5'-DIMETHYLERGOTAMINE 195 mg. of metallic potassium are dissolved in 920 mg. of absolute ethanol which has been diluted with 5 cc.

of absolute ether and the solution is diluted with about 20 cc. of liquid ammonia. 595 mg. of 5'-methylergotamine in solid state are then added to the solution, whereby a clear, yellow, fluorescing solution results during the course of 5 minutes. After the addition of 710 mg. of methyl iodide in 5 cc. of absolute ether the reaction mixture is stirred at −40° for half an hour. The ammonia is then sucked off in a vacuum and the residue divided between methylene chloride and water, the organic phase is washed with water, dried over sodium sulphate and the methylene chloride removed in a rotary evaporator. A brown foam is obtained which is chromatographed on a 30-fold quantity of aluminium oxide, activity I. Almost pure 1,5'-dimethylergotamine is eluted from the column with methylene chloride containing 0.1 to 0.2% of methanol; after crystallization from ethyl acetate 1,5'-dimethylergotamine is obtained in pure form. Colourless or slightly yellow coloured rodlets having an M.P. of 187–189° (decomp.), $[\alpha]_D^{20} = -105°$ (c.=0.7 in methylene chloride).

EXAMPLE 8.—5'-METHYL-9,10-DIHYDROERGOCRISTINE (a) (2R,5S,10aS,10bS)-2-ethoxycarbonyl - 5 - benzyl-3,6-dioxo-10b-hydroxy - 2 - isopropyl-5-methyloctahydro-8H-oxazolo[3,2-a]pyrrolo[2,1-c]pyrazine.—33 g. of (3S, 8aS)-3-benzyl-1,4-dioxo - 3 - methyloctahydropyrrolo[1,2-a]pyrazine are added to a mixture of 100 cc. of absolute dioxane and 26 cc. of absolute N-ethyldiisopropylamine and the mixture is cooled to 10°. 42 g. of S(+)-2-benzyloxy-2-isopropylmalonic acid chloride monoethyl ester are then added dropwise at 10° while stirring during the course of 10 minutes and the mixture is stirred at 20° for 1 hour and then at 60° for 4 hours. Working up is effected by cooling the mixture to 10° and adding dropwise an excess of ice-cold dilute phosphoric acid. Immediately thereafter extraction is effected thrice with ether, the combined ether solutions are successively washed with water, a saturated sodium hydrogen carbonate solution and again water, the ether solutions are dried with sodium sulphate and the solvent removed. The crystalline residue is hydrogenated in a solution of 750 cc. of methanol with 40 g. of prehydrogenated palladium/active charcoal catalyst at 50° and normal pressure. After 3.2 litres of hydrogen have been taken up, the reaction is completed. Working up is effected by filtering off the catalyst and removing the solvent. After crystallization from dioxane the crystalline residue yields (2R,5S,10aS,10bS)-2-ethoxycarbonyl-5-benzyl-3,6-dioxo-10b-hydroxy - 2 - isopropyl-5-methyloctahydro - 8H - oxazolo[3,2-a]pyrrolo[2,1-c]pyrazine, having an M.P. of 196°, $[\alpha]_D^{20} = +68°$ (c.=1, ethanol).

(b) (2R,5S,10aS,10bS) - 5 - benzyl - 2 - carboxy-3,6-dioxo - 10b - hydroxy - 2 - isopropyl - 5 - methyloctahydro-8H - oxazolo[3,2 - a]pyrrolo[2,1 - c]pyrazine.—50 g. of (2R,5S,10aS,10bS) - 2 - ethoxycarbonyl - 5 - benzyl-3,6-dioxo-10b-hydroxy - 2 - isopropyl - 5 - methyloctahydro-8H-oxazolo[3,2-a]pyrrolo[2,1-c]pyrazine are dissolved in 173 cc. of 2 N sodium hydroxide and 115 cc. of dioxane and the solution is stirred at 20° for 2 hours. Some active charcoal is then added and after filtering through Hyflo acidification is effected with 400 cc. of 1 N hydrochloric acid (pH about 2), whereby (2R,5S,10aS,10bS)-5-benzyl-2-carboxy-3,6-dioxo - 10b - hydroxy-2-isopropyl-5-methyloctahydro-8H-oxazolo[3,2-a]pyrrolo[2,1-c]pyrazine crystallizes. After standing for 1 hour in an ice bath filtration is effected and the crystals are dried in a high vacuum at 35°. (2R,5S,10aS,10bS)-5-benzyl-2-carboxy-3,6-dioxo-10b - hydroxy-2-isopropyl-5-methyloctahydro-8H-oxazolo[3,2-a]pyrrolo[2,1-c]pyrazine dihydrate has an M.P. of 150–152° (decomp.). After recrystallization from dioxane/ether until a constant M.P. is obtained, (2R,5S,10aS,10bS)-5-benzyl-2-carboxy - 3,6 - dioxo-10b-hydroxy-2-isopropyl - 5 - methyloctahydro-8H-oxazolo[3,2-a]pyrrolo[2,1-c]pyrazine monohydrate has an M.P. of 152° (decomp.), $[\alpha]_D^{20} = +48°$ (c.=1, pyridine).

(c) (2R,5S,10aS,10bS)-2-azidocarbonyl-5-benzyl - 3,6-dioxo-10b-hydroxy-2-isopropyl - 5 - methyloctahydro-8H-oxazolo[3,2-a]pyrrolo[2,1-c]pyrazine.—A mixture of 5 cc. of dimethyl formamide and 100 cc. of methylene chloride is cooled to −2°, is added dropwise to a solution of 3.4 cc. of oxalyl chloride in 25 cc of methylene chlorine and the resulting thick mass is stirred at 20° for 30 minutes. After cooling to 0°, 8.04 g. of (2R,5S,10aS,10bS)-5-benzyl-2-carboxy-3,6-dioxo - 10b - hydroxy-2-isopropyl-5-methyloctahydro-8H-oxazolo[3,2 - a]pyrrolo[2,1-c]pyrazine are added whereby the material dissolves completely and stirring is effected for a further 30 minutes at 0°. A solution of 8.0 g. of sodium azide in 25 cc. of water is subsequently added while mixing thoroughly with a vibrostirrer, whereby the temperature rises to +5°. After mixing for a further 5 minutes, 50 cc. of a 20% potassium hydrogen carbonate solution are added, mixing is effected for a further minute, the organic phase is separated and the aqueous phase is extracted twice with 50 cc. (each) of absolute methylene chloride. The organic phases are combined, washed once with 50 cc. of common salt solution, dried well with sodium sulphate and evaporated to dryness in a vacuum at 20°, whereby crystallization occurs. After washing with ether, (2R,5S,10aS,10bS)-2-azidocarbonyl-5-benzyl-3,6-dioxo-10b-hydroxy - 2 - isopropyl-5-methyloctahydro-8H-oxazolo[3,2-a]pyrrolo[2,1-c]pyrazine, having an M.P. of 130° (decomp.) is obtained. $[\alpha]_D^{20} = +141°$ (c.=0.8, methylene chloride).

(d) (2R,5S,10aS,10bS) - 5-benzyl-2-benzyloxycarbonylamino-3,6-dioxo-10b-hydroxy-2-isopropyl - 5 - methyloctahydro - 8H - oxazolo[3,2-a]pyrrolo[2,1-c]pyrazine.— 9.5 g. of (2R,5S,10aS,10bS)-2-azidocarbonyl-5-benzyl-3,6-dioxo-10b-hydroxy-2-isopropyl-5-methyloctahydro - 8H-oxazolo[3,2-a]pyrrolo[2,1-c]pyrazine are dissolved in 50 cc. of absolute chloroform, 4.0 g. of absolute benzyl alcohol and 1 drop of concentrated hydrochloric acid are added and the mixture is heated to the boil at reflux for half an hour. After removing the chloroform in a vacuum the residue is dissolved in a mixture of methylene chloride and ethyl acetate, active charcoal is added, filtration through Hyflo and dilution with ether are effected, whereby (2R,5S,10aS, 10bS) - 5 - benzyl - 2 - benzyloxycarbonylamino - 3,6 - dioxo - 10b-hydroxy-2-isopropyl-5-methyloctahydro - 8H - oxazolo[3,2-a]pyrrolo[2,1-c]pyrazine crystallizes in the form of prisms joined in druses, having an M.P. of 212° (decomp.), $[\alpha]_D^{20} = +38°$ (c.=1, pyridine).

(e) (2R,5S,10aS,10bS) - 2 - amino - 5 - benzyl - 3,6-dioxo - 10b - hydroxy - 2 - isopropyl-5-methyloctahydro-8H - oxazolo[3,2 - a]pyrrolo[2,1 - c]pyrazine hydrochloride.—4 g. of anhydrous palladium chloride are suspended in 50 cc. of absolute dimethyl formamide containing 1 g. of gaseous hydrochloric acid and prehydrogenation is effected as long as a taking up of hydrogen is observed. A solution of 9.5 g. of (2R,5S,10aS,10bS)-5-benzyl-2-benzyloxycarbonylamino - 3,6 - dioxo - 10b - hydroxy-2-isopropyl - 5 - methyloctahydro - 8H - oxazolo[3,2 - a] pyrrolo[2,1-c]pyrazine is added to the suspension of the resulting palladium and hydrogenation is effected at room temperature. After a hydrogenation period of 10 minutes 480 cc. of hydrogen have been taken up and the reaction is completed. The catalyst is removed by filtration and the filtrate evaporated to dryness. After recrystallization from tetrahydrofuran/ether (2R,5S,10aS,10bS)-2-amino-5 - benzyl - 3,6 - dioxo - 10b-hydroxy-2-isopropyl-5-methyloctahydro - 8H - oxazolo[3,2-a]pyrrolo[2,1-c]pyrazine hydrochloride, having an M.P. of 112° (decomp.), is obtained.

(f) 5'-methyl-9,10-dihydroergocristine.—A mixture of 40 cc. of absolute acetonitrile and 50 cc. of absolute dimethyl formamide is cooled to −15°, 9 g. of 9,10-dihydrolysergic acid chloride hydrochloride are added and 40 cc. of absolute pyridine are added dropwise at −15° while stirring during the course of 5 minutes, whereby a thick, brown mash is formed. 6.0 g. of (2R,5S,10aS, 10bS) - 2 - amino - 5 - benzyl - 3,6-dioxo-10b-hydroxy 2 - isopropyl - 5 - methyloctahydro - 8H-oxazolo[3,2-a]

pyrrolo[2,1-c]pyrazine hydrochloride are then added to this mixture and the reaction mixture is further stirred for 1½ hours, whereby the temperature is gradually allowed to rise to 0°. For purposes of working up the reaction mixture is poured into 150 cc. of 2 N hydrochloric acid which contains approximately the same amount of ice, the mixture is stirred well, is then made alkaline with 200 cc. of 2 N sodium carbonate solution and is extracted 5 times with methylene chloride containing some methanol so as to more readily dissolve the 5′-methyl-9,10-dihydro-ergocristine. The combined organic phases are first washed with an aqueous ammonia solution, then with a 15% common salt solution, are dried with sodium sulphate and the solvent is removed. A yellow foam is obtained, which is purified by crystallization from ethyl acetate. The resulting 5′-methyl-9,10-dihydro-ergocristine has an M.P. of 215° (decomp.), $[\alpha]_D^{20} = -5.8°$ (c.=1.0, pyridine).

The S(+)-2-benzyloxy-2-isopropylmalonic acid chloride monoethyl ester used as starting material in step (a) may be produced as follows:

(a′) 2 - benzyloxy - 2 - isopropylmalonic acid diethyl ester.—218 g. (1 mol) of 2-hydroxy-2-isopropylmalonic acid diethyl ester are added dropwise while cooling to 20–30° to 6.3 g. (1.3 mols) of a 50% sodium hydride dispersion in paraffin oil. After hydrogen evolution is completed, the reaction mixture is heated to 70° and 205 g. (1.2 mols) of benzyl bromide are added dropwise while cooling slightly (70–75°). The mixture is subsequently heated to 75° for 2 hours, 130 cc. of absolute alcohol are added and the temperature is kept at 75° for a further 30 minutes. After cooling to room temperature the reaction mixture is neutralized with glacial acetic acid, 4 litres of water are added, extraction is effected with ether and the ether extract is washed with water and a sodium bicarbonate solution. The ether phase is dried over sodium sulphate, the ether is distilled off and the residue is distilled in a high vacuum at a bath temperature of 180°, whereby pure 2-benzyloxy-2-isopropylmalonic acid diethyl ester, having a B.P. of 120–140°/0.2 mm. of Hg, is obtained.

(b′) 2 - benzyloxy-2-isopropylmalonic acid monoethyl ester.—924 g. (3.0 millimols) of 2-benzyloxy-2-isopropylmalonic acid diethyl ester are dissolved in 2400 cc. of ethanol, 4400 cc. (6.15 millimols) of a 1.40 N solution of potassium hydroxide in ethanol is added while stirring and the reaction mixture is stirred at 25° for 16 hours. After the addition of 3000 g. of ice, the pH of the mixture is adjusted to 8.0 with about 120 cc. of concentrated phosphoric acid and the ethanol is removed at 30–40° in a vacuum. After the addition of 3000 cc. of distilled water the pH value is adjusted to 8–9 with about 180 cc. of 4 N sodium hydroxide. The resulting light yellow solution is extracted thrice with 1000 cc. (each) of ether, whereby the extract is counter-extracted every time with 60 cc. (each) of a 10% sodium bicarbonate solution and the combined sodium bicarbonate extracts are added to the aqueous solution. The combined ether phases are extracted thrice with 500 cc. (each) of a 30% common salt solution and are dried over sodium sulphate. The alkaline aqueous solution is cooled to −5°, is covered with a layer of 3000 cc. of ether and is then slowly acidified with about 840 cc. of concentrated phosphoric acid to a pH of 2 while stirring vigorously. The two phases are separated and the aqueous phase is again extracted twice with 600 cc. (each) of ether. The combined ether solutions are washed with 600 cc. (each) of water (4 to 5 times) until the wash water has a pH value of 4, whereby the wash water is extracted back every time with 100 cc. (each) of ether. The combined ether solutions are washed twice with 600 cc. (each) of a 30% sodium chloride solution, dried over sodium sulphate, filtered off, concentrated and dried in a high vacuum until a constant weight is obtained. A viscous, slightly yellowish oil is obtained, which is homogeneous in accordance with thin layer chromatography (silica gel), eluant: methanol and chloroform methanol (7:3), $n_D^{20}=1.4988$.

(c′) R(+)-2-benzyloxy-2-isopropylmalonic acid monoethyl ester.—1460 g. (8.83 mols) of 1-pseudoephedrine, dried at 50° in a high vacuum for 16 hours, are added to a solution of 2330 g. (8.32 mols) of d,l-2-benzyloxy-2-isopropylmalonic acid monoethyl ester in 15 litres of ether on sodium wire, while stirring vigorously and in the absence of moisture, inoculation is effected with 1 g. of the diastereoisomer formed from 1 - pseudoephedrine and S(−)-2-benzyloxy - 2 - isopropylmalonic acid monoethyl ester and the mixture is allowed to stand at 0° for 2 days. A crystal crust is formed, which is decanted and washed with 1000 cc. of anhydrous ether. 3000 g. of ice are added to the ether solution and this is acidified by the careful addition of concentrated phosphoric acid while stirring vigorously. After separating the phases the aqueous phase is again extracted with 3× 1000 cc. of ether. The combined ether phases are washed 5 times with 2000 cc. (each) of water and the wash water is extracted every time with 500 cc. (each) of ether which are added to the combined ether phases. The pH of the last wash water should amount to about 4. After washing the ether phases with 2000 cc. of a 30% common salt solution, drying is effected over sodium sulphate and the solution is dried. A viscous, oily residue is obtained, which is dried at 30° in a high vacuum for 16 hours in a rotary evaporator while rotating slowly, until a constant weight is obtained. The resulting oil rich in R(+)-2-benzyloxy-2-isopropylmalonic acid monoethyl ester, is dissolved in 12 litres of ether on sodium wire and 1127 g. (6.81 mols) of d-pseudoephedrine, dried at 50° in a high vacuum for 16 hours, are added while stirring vigorously and in the absence of moisture. After dissolution (2–3 minutes) and inoculation with the diastereoisomer formed from d-pseudoephedrine and R(+)-2-benzyloxy-2-isopropylmalonic acid ethyl ester, the solution is allowed to stand at 0° for 2 days. The crystal crust is decanted and the crystalline mass is washed 5 times with 1000 cc. (each) of anhydrous ether. The resulting diastereoisomer formed from R(+)-2-benzyloxy-2-isopropylmalonic acid monoethyl ester and d-pseudoephedrine, is suspended in 5000 cc. of ether, 3000 g. of ice and 685 cc. of concentrated phosphoric acid are added while stirring, the phases are separated, the aqueous phase is extracted thrice with 1000 cc. (each) of ether and the combined ether solutions are washed 5 times with 1000 cc. (each) of water and counter-washed every time with 300 cc. (each) of ether. The pH of the last wash water should amount to 4. The combined ether solutions are washed with 1000 cc. of a 30% common salt solution, are dried over sodium sulphate, concentrated to dryness and dried in a high vacuum in a rotary evaporator with slow rotation. The residue is homogeneous in accordance with thin layer chromatography on silica gel in chloroform/methanol (7:3) (development with potassium permanganate). $[\alpha]_D^{20} = +8.2°$ (c.=5.0 in ethanol).

(d′) S(+)-2-benzyloxy-2-isopropylmalonic acid chloride monoethyl ester.—981 g. (3.5 millimols) of R(+)-2-benzyloxy-2-isopropymalonic acid monoethyl ester are dissolved in 1500 cc. of methylene chloride, the solution is cooled to −20°, a solution of 560 cc. (3.85 millimols) of dimethyl formamide in 530 cc. of methylene chloride is added, and subsequently a solution of 328 cc. (4.55 millimols) of thionyl chloride in 328 cc. of methylene chloride is added dropwise while stirring vigorously, the cooling bath is removed and the reaction mixture is stirred at 25° for a further 16 hours. The methylene chloride is evaporated off at 30° in a water jet vacuum and the bath temperature is subsequently raised from 30° to 70° As soon as distillation stops, this is continued in a high vacuum at a bath temperature of 70° for a further 3 hours, whereby a white by-product is sublimated which gives a violent reaction with water. A heterogeneous, dark brown mixture results, which is kept over night at −15°. A dark crystalline mass separates. The liquid is decanted in the absence of moisture and is distilled twice without fractionating in a high vacuum at a bath temperature of 140° and in the absence of moisture, whereby each distillation should not exceed a period of 3 hours (distillation temperature 120°/0.3 mm. of Hg and 105°/0.05 mm. of Hg). A slightly yellowish liquid is thus obtained. $n_D^{20}=1.5008$, $$[\alpha]_D^{20}=+51.3°$$

(c.=5.0 in benzene).

EXAMPLE 9.—1,5′-DIMETHYL-9,10-DIHYDROERGOCRISTINE 195 mg. of metallic potassium are dissolved in 1.0 cc. of absolute ethanol which has been diluted with 5 cc. of absolute ether and the solution is diluted with about 20 cc. of liquid ammonia. 595 mg. of 5′-methyl-9,10-dihydroergocristine in solid state are then added to this solution, whereby a clear, yellow, fluorescing solution results during the course of 5 minutes. After the addition of 710 mg. of methyl iodide in 5 cc. of absolute ether the reaction mixture is stirred at −40° for half an hour. The ammonia is then sucked off in a vacuum and the residue divided between methylene chloride and water, the organic phase is washed with water, dried over sodium sulphate and the methylene chloride removed in a rotary evaporator. A brown foam is obtained which is chromatographed on a 30-fold quantity of aluminium oxide, activity I. Almost pure 1,5′-dimethyl-9,10-dihydroergocristine is eluted from the column with methylene chloride containing 0.1 to 0.2% of methanol; after crystallization from ethyl acetate the compound is obtained in pure form. M.P. 210° (decom.), $[\alpha]_D^{20}=-37°$ (c.=1, pyridine).

EXAMPLE 10.—(2′R)-5′,5′-DIMETHYL-2′-PROPYLERGOPEPTINE (a) (8aS,αS) - 2-(α - ethoxycarbonyl - α - benzyloxyvaleryl) - 3,3 - dimethyl - 1,4 - dioxooctahydropyrrolo [1,2-a]pyrazine.—A suspension of 7.65 g. (42 millimols) of (8aS)-3,3-dimethyl-1,4-dioxooctahydropyrrolo[1,2-a] pyrazine in a mixture of 6.3 g. (80 millimols) of absolute pyridine and 5 cc. of absolute dioxane is cooled to 0°, and 11.9 g. (40 millimols) of S(+)-2-propyl-2-benzyloxymalonic acid chloride monoethyl ester are added dropwise while stirring within 10 minutes. The mixture is heated slowly to 50° while stirring and is kept at this temperature for 6 hours. The reaction mixture is subsequently poured on ice, a small excess of 2 N hydrochloric acid is added, extraction is effected thrice with 500 cc. amounts of ether, the combined ether phases are extracted with water, sodium hydrogen carbonate solution and again with water, are dried with sodium sulphate and the solvent is removed. The so obtained (8aS,αS)-2-(α-ethoxycarbonyl-α - benzyloxyvaleryl) - 3,3 - dimethyl - 1,4 - dioxooctahydropyrrolo[1,2-a]pyrazine, a viscous yellow resin, is further worked up in crude state.

(b) (2R,10aS,10bS) - 2 - ethoxycarbonyl-5,5-dimethyl-3,6-dioxo - 10b - hydroxy-2-propyloctahydro-8H-oxazolo [3,2-a]pyrrolo[2,1-c]pyrazine.—152 g. (342 millimols) of crude (8aS,αS) - 2 - (α-ethoxycarbonyl - α - benzyloxyvaleryl) - 3,3 - dimethyl - 1,4 - dioxooctahydropyrrolo [1,2-a]pyrazine which still contains small amounts of solvent, is dissolved in 1.1 litres of ethanol and hydrogenated at 40° and normal pressure with 30 g. of a palladium/active charcoal catalyst (10% Pd). After hydrogenation has been completed (6 hours, amount of hydrogen taken up: 8.6 litres) the catalyst is filtered off and the filtrate is evaporated to dryness, whereby a viscous resin results. This residue is dissolved in a minimum of ethyl acetate, the solution is treated with active charcoal and is diluted with a 4-fold quantity per volume of isopropyl ether. The solution is seeded, and after standing at +5° almost pure (2R,10aS,10bS)-2-ethoxycarbonyl-5,5-dimethyl - 3,6 - dioxo-10b-hydroxy-2-propyloctahydro-8H-oxazolo[3,2-a]pyrrolo[2,1-c]pyrazine crystallizes and is obtained in pure form after recrystallization from ethyl acetate/isopropyl ether. Fine needles, M.P. 88–89°, $[\alpha]_D^{20}=+42°$ (c.=2, ethanol), $pK^+_{MCS}=10.9$. IR spectrum in Nujol suspension: $\nu OH$ 3250–3350, broad, $\nu CO$ 1643, 1708, 1747 cm.$^{-1}$. NMR spectrum in CDCl$_3$: doublet δ 5.51/J2/1H/exchanges with D$_2$O, quadruplet δ 4.37/2H/J7/, multiplet δ 3.45–4, 0/3H/, multiplet δ 1.85–2.5/6H/, singlet δ 1.74/3H/, singlet δ 1.64/3H/, multiplet δ 0.8–1.6/2H superposed by triplet δ 1.37/J7/3H and triplet δ 1.08/J7/3H.

(c) (2R,10aS,10bS) - 2 - carboxy - 5,5 - dimethyl-3,6-dioxo - 10b - hydroxy - 2 - propyloctahydro-8H-oxazolo [3,2-a]pyrrolo[2,1-c]pyrazine.—60.2 g. (0.17 mol) of finely pulverized (2R,10aS,10bS)-2-ethoxycarbonyl-5,5-dimethyl - 3,6 - dioxo-10b-hydroxy-2-propyloctahydro-8H-oxazolo[3,2-a]pyrrolo[2,1-c]pyrazine are added portionwise while stirring to 170 cc. of a 2 N caustic soda solution which has been cooled to +2°, whereby the temperature gradually rises to 15°. The reaction mixture is subsequently stirred at room temperature for 2 hours, is acidified to a pH of 1 with about 170 cc. of 2 N hydrochloric acid, whereby (2R,10aS,10bS)-2-carboxy-5,5-dimethyl - 3,6 - dioxo-10b-hydroxy-2-propyloctahydro-8H-oxazolo[3,2-a]pyrrolo[2,1-c]pyrazine first results in oily form, which crystallizes immediately thereafter. The reaction mixture is stirred for another hour at 0°, filtration is effected and the precipitate is washed with some water. After drying in a high vacuum at 20° until a constant weight, (2R,10aS,10bS) - 2 - carboxy - 5,5 - dimethyl-3,6-dioxo - 10b - hydroxy - 2 - propyloctahydro - 8H-oxazolo [3,2 - a]pyrrolo[2,1 - c]pyrazine monohydrate, having an M.P. of 95–97°, is obtained. After recrystallization from acetone/water pointed, stem-like crystals are obtained, M.P. 96–97°, $[\alpha]_D^{20}=+50°$ (c.=2, ethanol), $$pK^+_{MCS}=3.7$$

IR spectrum in Nujol suspension: $\nu OH$ 3490, 3260, $\nu CO$ 1645, 1679, 1711 cm.$^{-1}$.

(d) (2R,10aS,10bS) - 2 - benzyloxycarbonylamino-5,5-dimethyl - 3,6 - dioxo - 10b - hydroxy-2-propyloctahydro-8H-oxazolo[3,2-a]pyrrolo[2,1-c]pyrazine.—A solution of 8.6 cc. (0.1 mol) of freshly distilled oxalyl chloride in 25 cc. of absolute acetonitrile is added dropwise to a solution of 9.6 cc. of absolute dimethyl formamide in 50 cc. of absolute acetonitrile within 10 minutes while stirring at −20°. The colourless crystal slurry is stirred for another 10 minutes at about −15° and then a solution of 17.2 g. (0.05 mol) of (2R,10aS,10bS)-2-carboxy-5,5-dimethyl - 3,6 - dioxo - 10b - hydroxy-2-propyloctahydro-8H-oxazolo[3,2-a]pyrrolo[2,1-c]pyrazine monohydrate in 150 cc. of absolute methylene chloride is added dropwise at −15° to −20° during the course of 5 minutes while stirring vigorously. A clear, slightly yellowish solution results, which is allowed to react at −10° to 0° for 30 minutes.

This solution is cooled to −15° for conversion into (2R,10aS,10bS) - 2 - azidocarbonyl - 5,5 - dimethyl-3,6-dioxo - 10b - hydroxy - 2 - propyloctahydro-8H-oxazolo [3,2-a]pyrrolo[2,1-c]pyrazine, a solution of 13 g. of sodium azide in 50 cc. of water is added in one batch while stirring vigorously, whereby the temperature immediately increases to 0°. After stirring for 3 minutes 250 cc. of ice-cold 20% potassium bicarbonate solution are added, the reaction mixture is stirred for another 2 minutes and diluted with methylene chloride. The aqueous phase is separated and extracted twice with 1000 cc. of methylene chloride. The combined methylene chloride solutions are dried at once with sodium sulphate and evaporated as quickly as possible in a rotary evaporator in a good vacuum and at a bath temperature of 20°. The resulting oil, which still contains dimethylformamide, is diluted with ether and seeded, whereby crystallization starts at once. Crystallization is completed by diluting with petroleum ether, and the solution is allowed to stand at 0° for 30 minutes. The precipitate is filtered off, washed with a mixture of ether and petroleum ether 1:1 and dried in a vacuum at 20° for a short period. Thus, (2R,10aS,10bS)-2 - azidocarbonyl-5,5-dimethyl - 3,6 - dioxo-10b-hydroxy- 2 - propyloctahydro - 8H - oxazolo[3,2-a]pyrrolo[2,1-c] pyrazine is obtained in a form of thin rod-like crystals having a decomposition point of about 95°.

13.8 g. (39.3 millimols) of (2R,10aS,10bS)-2-azidocarbonyl - 5,5 - dimethyl - 3,6 - dioxo - 10b - hydroxy-2-propyloctahydro - 8H - oxazolo[3,2-a]pyrrolo[2,1-c]pyrazine are taken up in 130 cc. of absolute chloroform, 8.2 g. (76 millimols) of absolute benzyle alcohol and one drop of conc. hydrochloric acid are added and are heated to the boil at reflux for 45 minutes. After removal of the volatile components in a vacuum and high vacuum the residue is crystallized from acetone/isopropyl ether, whereby pure (2R,10aS,10bS)-2-benzyloxycarbonylamino-5,5 - dimethyl - 3,6 - dioxo-10b-hydroxy-2-propyloctahydro-8H-oxazolo[3,2-a]pyrrolo[2,1-c]pyrazine precipitates. Colourless prisms, having an M.P. of 87–95°, $$[\alpha]_D^{20} = +42.5°$$

(c.=1, ethanol). IR spectrum in methylene chloride: $\nu$OH, NH 3440, 3300–3340, $\nu$CO 1650–1660, 1710, 1729, amide-II-band 1512 cm.$^{-1}$, NMR spectrum in DCCl$_3$: singlet $\delta$ 7.35/5H/, doublet $\delta$ 6.61/J2/1H/ exchanges with D$_2$O, singlet $\delta$ 6.39/1H exchanges with D$_2$O, singlet $\delta$ 5.10/2H/, multiplet $\delta$ 3.4–4.0/3H, complex multiplet 0.8–2.4/containing a total of about 22H, visible therein singlet $\delta$ 1.72/about 6H/, singlet $\delta$ 2.16/about 5H. The compound contains about 1 mole of acetone of crystallization.

(e) (2R,10aS,10bS) - 2 - amino-5,5-dimethyl-3,6-dioxo-10b-hydroxy - 2 - propyloctahydro-8H-oxazolo[3,2-a]pyrrolo[2,1-c]pyrazine.—4.89 g. of (2R,10aS,10bS)-2-benzyloxycarbonylamino - 5,5 - dimethyl - 3,6-dioxo-10b-hydroxy - 2 - propyloctahydro - 8H - oxazolo[3,2-a]-pyrrolo[2,1-c]pyrazine (containing 1 mole of acetone of crystallization, 10 millimols) are hydrogenated in 200 cc. of absolute tetrahydrofurane, containing 548 mg. (15 millimols) of gaseous hydrochloric acid and 5 cc. of dimethylformamide, with 2.5 g. of prehydrogenated palladium/active charcoal catalyst (10% Pd) at 20° and normal pressure. After the taking up of hydrogen is completed (25 minutes, amount of hydrogen taken up 195 cc.) the catalyst is filtered off and the filtrate concentrated to about 50 cc. in a vacuum at 20°, whereby (2R,10aS,10bS)-2-amino-5,5 - dimethyl-3,6-dioxo-10b-hydroxy-2-propyl-octahydro-8H - oxazolo[3,2-a]pyrrolo[2,1-c]-pyrazine-hydrochloride crystallizes. The crystals are filtered off, washed with ether and dried in a vacuum at 20°. M.P. 70–71°. NMR spectrum in Deutero-dimethyl sulfoxide:wide singlet $\delta$ 9.7/3H, exchanges with D$_2$O, wide singlet $\delta$ 8.76/1H/exchanges with D$_2$O, singlet $\delta$ 8.02/1H, multiplet $\delta$ 3.15–4.0/about 5H/, singlet $\delta$ 290/3–4H, singlet $\delta$ 2.73/3–4H/complex multiplet $\delta$ 0.7–2.3/about 19H/containing 2 singlets $\delta$ 1.58/3H/, 1 singlet $\delta$ 1.62/3H. From the NMR spectrum it may be deduced that the final product contains about 1½ moles of dimethylformamide and about ½ mole of tetrahydrofurane as solvent of crystallization.

(f) (2'R)-5',5'-dimethyl-2'-propylergopeptine.—4.15 g. of (2R,10aS,10bS) - 2-amino-5,5-dimethyl-3,6-dioxo-10b-hydroxy - 2 - propyloctahydro - 8H-oxazolo[3,2-a]pyrrolo[2,1-c]pyrazine-hydrochloride and 6.5 g. of d-lysergic acid chloride hydrochloride are suspended in 50 cc. of absolute methylene chloride, the suspension is cooled to $-10°$ and 35 cc. of absolute pyridine are added dropwise while stirring during the course of 10 minutes. The mixture is then allowed to react for about 30 minutes at 0° and about 1½ hours at 20°.

The reaction mixture is subsequently worked up in a manner analogous to that described in Example 8, step (f). The resulting crude product is solved in methylene chloride and a small amount of insoluble slurry is filtered off. After the addition of methanol the solution is filtered through active charcoal and concentrated in a rotary evaporator in a vacuum, whereby part of the (2'R)-5',5'-dimethyl-2'-propylergopeptinine crystallizes. The precipitate is recrystallized twice from methylene chloride/methanol whereby colourless needles are obtained, M.P. 225–226° (decomp.), $[\alpha]_D^{20} = +405°$ (c.=0.8, methylene chloride). UV spectrum in methanol: $\lambda_{max}$ 240(4.32), 312(3.95) m$\mu$, minimum at 269.5 m$\mu$. IR spectrum in methylene chloride: $\nu$ OH,NH 3460,3150–3300, $\nu$ CO 1640–1660,1723 cm.$^{-1}$. NMR spectrum in Deutero-dimethyl sulfoxide doublet $\delta$ 10.8/J2/1H/exchanges with D$_2$O, singlet $\delta$ 9.97/1H/ exchanges with multiplet $\delta$ 7.0–7.4/4H/, doublet $\delta$ 6.5/J4/1H, complex multiplet $\delta$ 0.8–4.0/about 30H, containing singlet $\delta$ 1.57/3H, singlet $\delta$ 50/3H.

The mother liquor is chromatographed on a 30-fold quantity of aluminium oxide, activity II–III. A further amount of (2'R)-5',5'-dimethyl-2'-propylergopeptinine is washed from the column with methylene chloride, (2'R)-5',5'-dimethyl-2'-propylergopeptine is eluted in an already quite pure form with methylene chloride containing 0.2% of methanol and is obtained in pure form after crystallizing twice from methylene chloride/ethyl acetate: Colourless polyhedrons, M.P. indefinite at 175–180° (decomp.), $[\alpha]_D^{20} = +52°$ (c.=1, methylene chloride/ethanol 1:1), IR spectrum in methylene chloride: $\nu$ OH,NH 3470,3150–3300, $\nu$ CO 1649–1662,1728 cm.$^{-1}$, amide-II-band at 1535–1545 cm.$^{-1}$. UV spectrum in methanol: $\lambda_{max}$ 239(4.32), 312.5(3.96) m$\mu$, minimum at 269.5 m$\mu$ NMR spectrum in Deutero-dimethyl sulfoxide:singlet $\delta$ 10.78/1H/exchanges with D$_2$O, singlet $\delta$ 9.44/1H/exchanges with D$_2$O, multiplet $\delta$ 6.95–7.35/5H/1H exchanges with D$_2$O, singlet 6.3/1H/, complex multiplet $\delta$ 0.8–4.0/about 30H, containing: singlet $\delta$ 2.5/3H, singlet $\delta$ 1.64/3H, singlet $\delta$ 1.56/3H/. Sulphate: M.P. 204–205° (decomp.).

The S(+)-2-propyl-2-benzyloxy-malonic acid chloride monoethylester used as starting material in Example 10, step (a) may be produced as follows:

(a') 2-benzyloxy-2-propyl-malonic-acid-diethyl-ester.—345.6 g. of a sodium hydride dispersion (50%) are added to 3.5 litres of toluene. 1272 g. of 2-propyl malonic acid diethylester is added dropwise at 30–35° while cooling and the mixture is heated to 50° for 1 hour. The reaction mixture is subsequently cooled to 20° and a solution of 1452 g. of dibenzoylperoxide in 14.5 litres of toluene is added dropwise, whereby the temperature shall not rise over 27°. The mixture is then heated to 35–40° for 2 hours and is then cooled to room temperature. Working up is effected by shaking out thrice with water, drying the organic phase with sodium sulphate, distilling off the solvent and removing the volatile components from the residue by distillation at 85°/0.5 mm. of Hg. The distillation residue is the crude 2-benzoyloxy-2-propyl-malonic acid ethyl ester.

330 g. of a sodium hydride dispersion (50%) are added to 4 litres of dimethylacetamide and 315 g. of absolute ethanol are added at 40°. The mixture is allowed to react at 50° for 1 hour and is then cooled to 40°. Crude 2-benzoyloxy-2-propyl-malonic-acid-diethyl ester is then added while cooling at such a rate that the temperature does not rise over 44°. 1173 g. of benzyl bromide are subsequently added dropwise while cooling and the solution is kept at 45–50° for 2 hours. 12 g. of sodium is dissolved in 660 cc. of absolute ethanol and then added and the mixture is again kept at 45° for 20 minutes. After cooling to room temperature the mixture is neutralized with about 15 cc. of glacial acetic acid, 15 litres of ice water are added and shaking out is effected several times with toluene. The organic phase is washed with water until neutral and dried with sodium sulphate. After distilling off the toluene a residue consisting of 2-benzyloxy-2-propyl-malonic-acid diethyl ester and benzoic acid ethyl ester is obtained. After subsequent distillation in a high vacuum the first runnings are separated up to 100°/0.5 mm. of Hg. 2-benzyloxy-2-propylmalonic-acid diethyl ester distills above this temperature. B.P. (0.2 mm. of Hg): 100–152° $n_D^{20}$=1.4791.

(b') S(+)-2-benzyloxy - 2 - propylmalonic acid chloride monoethyl ester.—2-benzyloxy-2-propylmalonic acid diethyl ester is saponified in a manner analogous to that indicated in Example 8, step (b'), except that only 10% excess of lye is used and the resulting monoethyl ester is liberated from the corresponding alkali metal salt at a pH of 3.5. The resulting 2-benzyloxy-2-propyl-malonic acid monoethyl ester is split into the optical antipods with pseudoephedrine, this splitting being effected in a manner analogous to that described in Example 8, step (c'), except that only one third of the indicated amounts of solvent is used in each case, S(−)-2-benzyloxy-2-propyl-malonic acid ethyl ester is separated with d-pseudoephedrine and the desired R(+)-2-benzyloxy-2-propylmalonic acid monoethyl ester is converted into a difficultly soluble salt with 1-pseudoephedrine. The salt formed from R(+)-2-benzyloxy-2-propylmalonic acid monoethyl ester and 1-pseudoephedrine is isolated in a manner analogous to that indicated in Example 8, step (c'), is optionally purified by recrystallization and is separated into its components. The so obtained pure R(+)-2-benzyloxy-2-propylmalonic acid monoethyl ester has a rotation value $[\alpha]_D^{20} = +6.9°$ (c.=5, ethanol) and is converted in a manner analogous to that described in Example 8, step (d') into S(+)-2-benzyloxy-2-propylmalonic acid chloride monoethyl ester. S(+)-2-benzyloxy-2-propylmalonic acid chloride monoethyl ester has the following physic constants: B.P. (0.03 mm./of Hg):99–101° $n_D^{20}$=1.4960, $[\alpha]_D^{20}$=+27.2° (c.=2, benzene).

EXAMPLE 11—(2'R)-5',5'-DIMETHYL-2'-PROPYL-9,10-DIHYDRO-ERGOPEPTINE 15 g. (46 millimoles) of 9,10-dihydrolysergic acid chloride hydrochloride are reacted with 11 g. (0.23 millimoles) of (2R,10aS,10bS)-2-amino-5,5-dimethyl-3,6-dioxo-10b-hydroxy - 2 - propyloctahydro-8H-oxazolo[3,2-a]pyrrolo[2,1-c]pyrazine hydrochloride in a manner analogous to that described in Example 10, step (f).

After the reaction is completed the reaction mixture is poured into 150 cc. of 2 N hydrochloric acid containing about the same amount of ice, is stirred well, is made alkaline with a 2 N sodium carbonate solution, is diluted with about 300 cc. of chloroform and the mixture is shaken thoroughly. The phases are separated and the aqueous phase extracted thrice with 250 cc. amounts of chloroform containing small amounts of ethanol. The combined chloroform extracts are washed once with 300 cc. of a 2 N sodium carbonate solution, dried over sodium sulphate and the solvent is removed in a vacuum. The residue is crystallized from alcohol, whereby a light yellow precipitate is obtained, which is obtained in pure form after recrystallizing once more from methylene chloride/ethanol: M.P. 248° (decomp.), $[\alpha]_D^{20}$=+21° (c.=1, methylene chloride/ethanol 1:1), pointed, short rodlets. UV spectrum: $\lambda_{max}$ 222(4.52), 280.5(3.84), 291(3.75) mμ minimum at 245 mμ. IR spectrum in Nujol: ν OH,NH 3350, 3260, 3080, ν CO 1635, 1724 cm.⁻¹.

EXAMPLE 12.—(2'R)2' - propyl - 1,5',5' - trimethyl-ergopeptine.—1.15 g. (50 millimoles) of metallic sodium are added to about 100 cc. of liquid ammonia and a solution of 4.6 g. of absolute ethanol in 10 cc. of absolute ether is added dropwise at −50° while stirring. The dark blue solution is decolourized after about 45 minutes. 5.47 g. (10 millimoles) of (2'R)-5',5'-dimethyl-2'-propylergopeptine are added to the resulting colourless suspension, stirring is effected for 10 minutes and 7.1 g. (50 millimoles) of methyl iodide in 10 cc. of absolute ether are added dropwise at −45° to the yellow, green fluorescent turbid solution, whereby a thick mash is formed which, however, again dissolves almost completely after stirring for 45 minutes. Working up is effected by removing the ammonia in a vacuum and working up the residue in a manner analogous to that described in Example 7. The residue is chromatographed on a 35-fold quantity of aluminum oxide, activity II–III. The still impure methylate on product is eluted from the column with methylene chloride containing 0.2% of methanol and is obtained in pure form after recrystallizing several times from methanol: Practically colourless prisms, M.P. 163–168°, $[\alpha]_D^{20}$=−169° (c.=1, methylene chloride).

EXAMPLE 13.—(2'R)-2'-propyl-1,5',5'-trimethyl-9,10-dihydroergopeptine. 5.49 g. (10 millimoles) of (2'R)-5',5'-dimethyl - 2' - propyl - 9,10 - dihydroergopeptine are methylated with 1.15 g. (50 millimoles) of sodium in 150 cc. of liquid ammonia with 7.1 g. (50 millimoles) of methyl iodide, in a manner analogous to that described in Example 12. Purification of the crude product obtained after working up with methylene chloride and water (see Example 7) is effected by direct crystallization from methylene chloride/ethanol: colourless needles, M.P. 217–218° (decomp.), $[\alpha]_D^{20}$=+20° (c.=1, methylene chloride/ethanol 1:1).

EXAMPLE 14.—(2'R)-2'-ETHYL-5',5'-DIMETHYL-9,10-DIHYDROERGOPEPTINE (a) (2R,10aS,10bS) - 2 - ethoxycarbonyl-2-ethyl-5,5-dimethyl-3,6-dioxo - 10b - hydroxyoctahydro-8H-oxazolo [3,2-a]pyrrolo[2,1-c]pyrazine.—5.103 g. (28 millimoles) of (8aS)-3,3-dimethyl-1,4-dioxooctahydro-pyrrolo[1,2-a] pyrazine are condensed with 7.47 g. (28 millimoles) of S(+)-2-ethyl - 2 - benzyloxymalonic acid chloride monoethyl ester in the presence of 4.43 g. (56 millimoles) of absolute pyridine in a manner analogous to that described in Example 10, step (a) and are worked up in a manner analogous to that indicated in that example. The resulting crude condensation product, which is obtained in the form of a yellow viscous oil, is used for the next reaction without further purification.

99.5 g. of the condensation product obtained above are hydrogenated in 1 litre of ethanol at 40° and normal pressure with 30 g. of prehydrogenated palladium/active charcoal catalyst (10% Pd). After the taking up of the hydrogen is completed (4 hours, quantity of hydrogen taken up 5.1 litres) the catalyst is filtered off and most of the solvent is removed. The remaining viscous oil is recrystallized from isopropyl ether whereby already pure (2R,10aS,10bS)-2-ethoxycarbonyl - 2 - ethyl - 5,5 - dimethyl-3,6-dioxo - 10b - hydroxyoctahydro - 8H - oxazolo-[3,2-a]pyrrolo[2,1-c]pyrazine, having a M.P. of 109–110°, is obtained. The mother liquor is taken up in ether, filtered through 40 g. of silica gel, the filtrate is dried and the residue crystallized from isopropyl ether. A further amount of (2R,10aS,10bS)-2-ethoxycarbonyl-2-ethyl - 5,5 - dimethyl - 3,6 - dioxo - 10b - hydroxyocta-hydro-8H-oxazolo[3,2-a]pyrrolo[2,1-c]pyrazine, having a M.P. of 109–110°, is obtained. A further example of the compound recrystallized twice from isopropylether has a M.P. of 110–111°, $[\alpha]_D^{20}$=+45.5° (c.=1, ethanol). IR spectrum in methylene chloride: ν OH, 3530,3370, ν CO 1650,1708–1720,1757 cm.⁻¹·pK⁺$_{MCS}$=10.85. NMR spectrum in CDCl₃: doublet δ 5.50/J2/1H/exchanges with D₂O, quadruplet δ 4.35/J7/2H/, multiplet δ 3.3–4.0/3H/, multiplet δ 1.85–2.5/6H/, singlet δ 1.73/3H, singlet δ 1.63/3H, triplet δ 1.30/J7/3H/, triplet δ 0.90/J7/3H.

(b) (2R,10aS,10bS) - 2 - ethyl - 2 - carboxy - 5,5-dimethyl - 3,6-dioxo - 10b - hydroxyoctahydro - 8H - oxazolo[3,2-a]pyrrolo[2,1-c]pyrazine.—34 g. (0.1 mole) of (2R,10aS,10bS) - 2 - ethoxycarbonyl - 2 - ethyl - 5,5-dimethyl - 3,6 - dioxo - 10b - hydroxyoctahydro - 8H-oxazolo[3,2-a]pyrrolo[2,1-c]pyrazine are added to 67 cc. of a 3 N sodium hydroxide solution at 0° while stirring, whereby the solution gradually heats itself to room temperature. The solution is stirred at 20° for 1¾ hours and the pH value of the solution is then adjusted to 1.5 with 50 cc. of 4 N hydrochloride acid, whereby most of the (2R,10aS,10bS)-2-ethyl-2-carboxy - 5,5 - dimethyl - 3,6-dioxo - 10b - hydroxyoctahydro - 8H - oxazolo[3,2-a] pyrrolo[2,1-c]pyrazine crystallizes. The mixture is allowed to stand in an ice bath for 1 hour, is filtered, the precipitate is washed with a small amount of ice water and dried in a high vacuum at room temperature until a constant weight is obtained. Fine needles, having a M.P. of 78–79° (decomp.), $[\alpha]_D^{20}$=+52° (c.=1, ethanol). IR spectrum in methylene chloride: ν OH 3300–3350, ν CO 1608,1650, 1718 cm.⁻¹. NMR spectrum in NaOD: singlet δ 4.93/2H, multiplet δ 3.52–4.3/3H/, multiplet δ 1.65–3.15/12H, visible therein: singlet δ 1.77/3H/, singlet δ 1.80/3H/, triplet δ 1.07/J7/3H/. The cyclol carboxylic acid crystallizes in almost anhydrous form.

(c) (2R,10aS,10bS) - 2 - ethyl - 2 - benzyloxycarbonylamino - 5,5 - dimethyl - 3,6 - dioxo - 10b - hydroxyoctahydro - 8H - oxazolo[3,2-a]pyrrolo[2,1-c]pyrazine.—18.7 g. (60 millimoles) of (2R,10aS,10bS) - 2 - ethyl - 2 - carboxy-5,5 - dimethyl - 3,6 - dioxo-10b - hydroxyoctahydro - 8H-oxazolo[3,2-a]pyrrolo[2,1-c]pyrazine are converted in a manner analogous to that described in Example 8, steps (c) and (d), into (2R,10aS,10bS)-2-ethyl-2-benzyloxycarbonylamino - 5,5 - dimethyl-3,6-dioxo-10b-hydroxy-octahydro - 8H - oxazolo[3,2-a]pyrrolo[2,1-c] pyrazine. The crude product is purified by crystallization from acetone/isopropylether, M.P. 190–192°,

[α]_D^{20} = +48°

(c.=1, ethanol), pointed, stem-like crystals.

(d) (2R,10aS,10bS) - 2 - amino - 2 - ethyl - 5,5 - dimethyl - 3,6 - dioxo - 10b - hydroxyoctahydro - 8H-oxazolo[3,2-a]pyrrolo[2,1-c]pyrazine.—4.17 g. (10 millimoles) of (2R,10aS,10bS) - 2 - ethyl - 2 - benzyloxycarbonyl-amino - 5,5 - dimethyl - 3,6 - dioxo - 10b - hydroxyoctahydro - 8H - oxazolo[3,2-a]pyrrolo[2,1-c]pyrazine are hydrogenated in a mixture of 200 cc. of absolute tetrahydrofurane with 3 cc. of absolute dimethylformamide containing 15 millimoles of hydrochloric acid, at 20° and normal pressure with 2 g. of prehydrogenated palladium/active charcoal catalyst. After the taking up of hydrogen is completed (5 minutes, amount of hydrogen taken up 130 cc.), hydrogenation is continued for a further 15 minutes, the catalyst is filtered off, and extraction is effected with dimethylformamide, tetrahydrofurane 1:1. The filtrate and the extract are combined and most of the solvent is evaporated at first at 11 mm. of Hg and then in a high vacuum at 20°. The remaining solution is diluted with absolute ether, whereby (2R,10aS,10bS)-2-amino - 2 - ethyl - 5,5 - dimethyl - 3,6 - dioxo - 10b-hydroxyoctahydro - 8H - oxazolo[3,2-a]pyrrolo[2,1-c]pyrazine-hydrochloride is obtained in a form of compact crystal druses, having a M.P. of 133–135°. This product which still contains solvent of crystallization is used as starting material in the next step without further purification.

(e) (2′R) - 2 - ethyl - 5′,5′ - dimethyl - 9,10 - dihydroergopeptine.—3.13 g. (8 millimoles) of (2R,10aS,10bS)-2 - amino - 2 - ethyl - 5,5 - dimethyl - 3,6 - dioxo - 10b-hydroxyoctahydro - 8H - oxazolo[3,2-a]pyrrolo[2,1-c] pyrazine hydrochloride are condensed with 5.2 g. (16 millimoles) of 9,10-dihydrolysergic acid chloride hydrochloride in a manner described in Example 10, step (f). After working up in a manner described in Example 10, step (f) crude (2′R)-2-ethyl-5′,5′-dimethyl-9,10-dihydroergopeptine is obtained in crystalline form. This crude product is crystallized twice from a mixture of 200 cc. of methylene chloride and 100 cc. of ethanol whereby pure (2′R)-2′-ethyl-5′,5′-dimethyl - 9,10 - dihydroergopeptine is obtained as rod-like crystals, having a M.P. of 263–264° (decomp.), [α]_D^{20} = +25° (c.=0.5, methylene chloride/ethanol 1:1).

What is claimed is:
1. A compound of general formula:

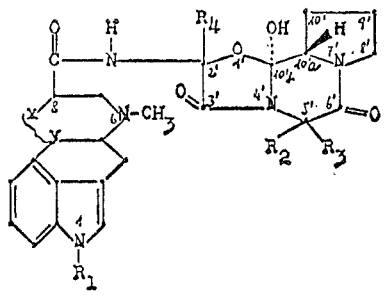

in which $R_1$ is hydrogen or methyl, $R_2$ is alkyl of 1 to 4 carbon atoms, $R_3$ is alkyl of 1 to 4 carbon atoms or benzyl, or $R_2$ and $R_3$ together with the carbon atom in the 5′ position form a 4- to 7-membered, saturated, carbocyclic ring, $R_4$ is alkyl of 1 to 3 carbon atoms , and

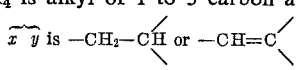

and pharmaceutically acceptable acid addition salts thereof.

2. A compound according to claim 1, in which $R_4$ is methyl.

3. A compound according to claim 1, which is ergospironine.

4. A compound according to claim 1, which is 9,10-dihydroergospironine.

5. A compound according to claim 1, which is 5′-methylergoalanine.

6. A compound according to claim 1, which is 9,10-dihydro-5′-methylergoalanine.

7. A compound according to claim 1, which is 5′-methyl-9,10-dihydroergotamine.

8. A compound according to claim 1, which is 5′-methylergotamine.

9. A compound according to claim 1, which is 1,5′-dimethylergotamine.

10. A compound according to claim 1, which is 5′-methyl-9,10-dihydroergocristine.

11. A compound according to claim 1, which is 1,5′-dimethyl-9,10-dihydroergocristine.

12. A compound according to claim 1, which is (2′R)-5′,5′-dimethyl-2′-propylergopeptine.

13. A compound according to claim 1, which is (2′R)-5′,5′-dimethyl-2′-propyl-9,10-dihydroergopeptine.

14. A compound according to claim 1, which is (2′R)-2′-propyl,1,5′,5′-trimethylergopeptine.

15. A compound according to claim 1, which is (2′R)-2′-propyl-1,5′,5′-trimethyl-9,10-dihydroergopeptine.

16. A compound according to claim 1, which is (2′R)-2-ethyl-5′,5′-dimethyl-9,10-dihydroergopeptine.

References Cited
UNITED STATES PATENTS

| | | | |
|---|---|---|---|
| 3,113,133 | 12/1963 | Hofmann et al. | 260—285.5 |
| 3,272,823 | 9/1966 | Arcamone et al. | 260—285.5 |
| 3,336,311 | 8/1967 | Hofmann et al. | 260—268 |
| 3,422,110 | 1/1969 | Stadler et al. | 260—268 |

DONALD G. DAUS, Primary Examiner

U.S. Cl. X.R.

260—268PE, 268IR, 268B, 268DK, 285.5, 326.8, 464, 468R, 5.14R; 424—250